(12) United States Patent
Inagaki et al.

(10) Patent No.: US 12,187,017 B2
(45) Date of Patent: Jan. 7, 2025

(54) BIODEGRADABLE LAMINATE

(71) Applicant: Mitsubishi Chemical Corporation, Chiyoda-ku (JP)

(72) Inventors: Mai Inagaki, Chiyoda-ku (JP); Atsushi Kusuno, Chiyoda-ku (JP); Kohei Kikuchi, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 17/001,868

(22) Filed: Aug. 25, 2020

(65) Prior Publication Data

US 2020/0384750 A1 Dec. 10, 2020

Related U.S. Application Data

(63) Continuation of application No. PCT/JP2019/013961, filed on Mar. 29, 2019.

(30) Foreign Application Priority Data

Mar. 30, 2018 (JP) ................................. 2018-067298

(51) Int. Cl.
*B32B 27/36* (2006.01)
*B32B 7/10* (2006.01)
(Continued)

(52) U.S. Cl.
CPC ................ *B32B 27/36* (2013.01); *B32B 7/10* (2013.01); *B32B 7/12* (2013.01); *B32B 27/20* (2013.01);
(Continued)

(58) Field of Classification Search
None
See application file for complete search history.

(56) References Cited

U.S. PATENT DOCUMENTS 5,258,422 A * 11/1993 Chang .................. C08K 5/0033
524/394
6,146,750 A * 11/2000 Kotani .................. B32B 27/306
428/323
(Continued)

FOREIGN PATENT DOCUMENTS

EP 2 781 351 A1 9/2014
JP 04-146953 A * 5/1992
(Continued)

OTHER PUBLICATIONS

International Search Report issued Jul. 2, 2019 in PCT/JP2019/013961 filed on Mar. 29, 2019, 4 pages.

(Continued)

*Primary Examiner* — Vivian Chen
(74) *Attorney, Agent, or Firm* — Oblon, McClelland, Maier & Neustadt, L.L.P.

(57) ABSTRACT

A biodegradable laminate includes: an aliphatic polyester-based resin layer; a bonding layer; and a polyvinyl alcohol-based resin layer laminated on at least one surface of the aliphatic polyester-based resin layer with the bonding layer therebetween. The aliphatic polyester-based resin layer includes an aliphatic polyester-based resin composition containing an aliphatic polyester-based resin (A) including a repeating unit derived from an aliphatic diol and a repeating unit derived from an aliphatic dicarboxylic acid as main constituent units, a polyhydroxyalkanoate (B) including a 3-hydroxybutyrate unit as a main constituent unit, and an inorganic filler (C).

21 Claims, 1 Drawing Sheet

(51) Int. Cl.
- *B32B 7/12* (2006.01)
- *B32B 27/08* (2006.01)
- *B32B 27/20* (2006.01)
- *B32B 27/30* (2006.01)
- *C08K 3/013* (2018.01)
- *C08K 3/26* (2006.01)
- *C08K 3/34* (2006.01)
- *C08K 3/36* (2006.01)
- *C08L 67/02* (2006.01)
- *C08L 67/04* (2006.01)
- *C08L 101/16* (2006.01)
- *C09J 167/02* (2006.01)
- *C09J 167/03* (2006.01)

(52) U.S. Cl.
CPC ............ *B32B 27/306* (2013.01); *B32B 27/08* (2013.01); *B32B 2250/02* (2013.01); *B32B 2250/03* (2013.01); *B32B 2250/24* (2013.01); *B32B 2264/1026* (2020.08); *B32B 2264/1027* (2020.08); *B32B 2307/7163* (2013.01); *C08K 3/013* (2018.01); *C08K 2003/265* (2013.01); *C08K 3/34* (2013.01); *C08K 3/346* (2013.01); *C08K 3/36* (2013.01); *C08L 67/02* (2013.01); *C08L 67/04* (2013.01); *C08L 101/16* (2013.01); *C09J 167/02* (2013.01); *C09J 167/03* (2013.01); *Y02W 90/10* (2015.05)

(56) References Cited

U.S. PATENT DOCUMENTS

| | | | |
|---|---|---|---|
| 6,191,203 B1* | 2/2001 | Asrar | C08L 67/04 524/308 |
| 8,604,123 B1* | 12/2013 | Weismann | C08K 3/346 524/401 |
| 9,340,659 B2 | 5/2016 | Suzuki et al. | |
| 10,710,342 B2* | 7/2020 | Inoue | B32B 27/28 |
| 2002/0123546 A1* | 9/2002 | Bigg | D21H 17/53 528/355 |
| 2005/0203208 A1* | 9/2005 | Ruiz | C08K 3/346 523/124 |
| 2006/0252862 A1* | 11/2006 | Mannle | C08K 5/0091 524/543 |
| 2009/0149606 A1* | 6/2009 | Meissner | C08K 5/098 525/360 |
| 2009/0191371 A1 | 7/2009 | Uradnisheck | |
| 2011/0190430 A1 | 8/2011 | Nakamura | |
| 2012/0108743 A1* | 5/2012 | Krishnaswamy | B32B 27/36 524/599 |
| 2013/0109781 A1* | 5/2013 | Lake | C08K 5/0033 523/124 |
| 2014/0004350 A1* | 1/2014 | Shibutani | B32B 27/306 428/413 |
| 2014/0030536 A1* | 1/2014 | Krishnaswamy | B32B 7/12 428/483 |
| 2014/0308534 A1* | 10/2014 | Inoue | B32B 27/08 428/483 |
| 2015/0147929 A1* | 5/2015 | Krishnaswamy | C08J 5/18 442/199 |
| 2015/0291771 A1 | 10/2015 | Suzuki et al. | |
| 2015/0337094 A1* | 11/2015 | Wong | B32B 7/12 524/35 |
| 2016/0257098 A1* | 9/2016 | Nissenbaum | C08J 5/18 |
| 2016/0311203 A1 | 10/2016 | Yamamoto et al. | |
| 2017/0198137 A1* | 7/2017 | Blanchard | C08J 3/22 |
| 2018/0100060 A1* | 4/2018 | LaPray | C08L 3/02 |
| 2018/0118895 A1* | 5/2018 | Johnson | C08J 3/18 |
| 2018/0304573 A1 | 10/2018 | Tokunaga et al. | |
| 2018/0334564 A1* | 11/2018 | Andrews | C08L 67/02 |
| 2018/0345637 A1* | 12/2018 | Hackfort | B32B 9/045 |
| 2020/0056037 A1* | 2/2020 | Schmidt | B32B 27/20 |
| 2020/0231730 A1* | 7/2020 | Misawa | B32B 27/18 |
| 2021/0130606 A1* | 5/2021 | Friedek | C08L 101/16 |
| 2022/0297414 A1* | 9/2022 | Hackfort | B32B 27/36 |

FOREIGN PATENT DOCUMENTS

| | | |
|---|---|---|
| JP | 2013-212682 A | 10/2013 |
| JP | WO2014/068943 A1 | 5/2014 |
| JP | 2014-144553 A | 8/2014 |
| JP | WO2017/069127 A1 | 4/2017 |
| JP | 2017-132967 A | 8/2017 |
| WO | WO 2010/013483 A1 | 2/2010 |
| WO | WO 2012/142100 A1 | 10/2012 |
| WO | WO 2013/069726 A1 | 5/2013 |
| WO | WO 2019/049798 A1 | 3/2019 |

OTHER PUBLICATIONS

Extended European Search Report issued Mar. 23, 2021 in corresponding European Patent Application No. 19775478.1, 7 pages.
Combined Chinese Office Action and Search Report issued Apr. 7, 2022 in Patent Application No. 201980019161.6 (with English machine translation), 16 pages.
Office Action dated Oct. 25, 2022, in European Patent Application No. 19775478.1 filed Mar. 29, 2019.
Office Action dated Sep. 13, 2022, in Chinese Patent Application No. 201980019161.6 filed Mar. 29, 2019 (with machine generated English translation).
Office Action dated Dec. 6, 2022, in Japanese Patent Application No. 2019-066228 filed Mar. 29, 2019 (with machine generated English translation).
European Office Action issued Jul. 24, 2023 in European Patent Application No. 19775478.1, 7 pages.

* cited by examiner

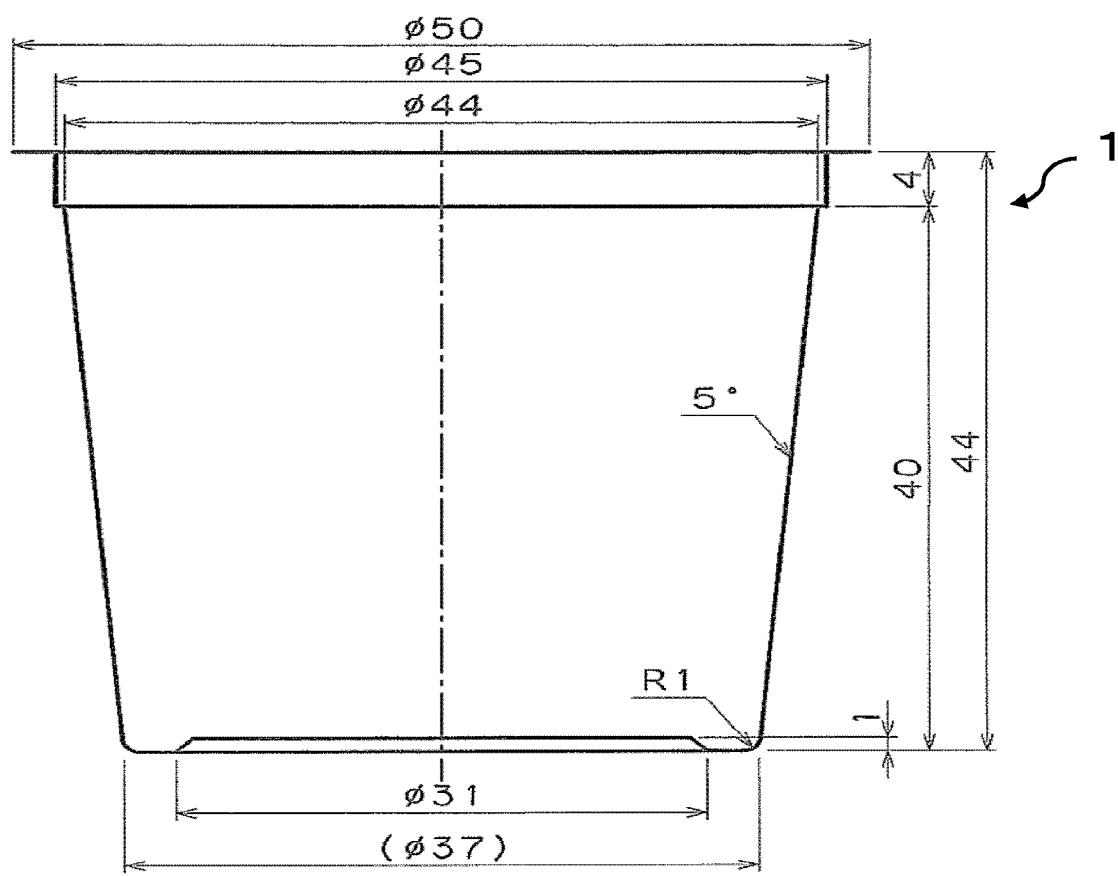

BIODEGRADABLE LAMINATE

CROSS-REFERENCE TO RELATED APPLICATIONS

The present application is a bypass continuation of international application PCT/JP2019/013961, filed on Mar. 29, 2019, and claims the benefit of the filing date of Japanese Appl. No. 2018-067298, filed on Mar. 30, 2018.

TECHNICAL FIELD

The present invention relates to a biodegradable laminate prepared by laminating a polyvinyl alcohol-based resin layer onto at least one surface of an aliphatic polyester-based resin layer with a bonding layer therebetween.

BACKGROUND ART

Plastic waste causes large loads on the global environment such as influences on ecosystems, generation of hazardous gases during combustion, and global warming due to a large amount of combustion heat. In recent years, to solve this problem, development is being actively conducted on biodegradable plastics.

In particular, carbon dioxide generated when biodegradable plastics of plant origin are combusted was originally present in the air, and the combustion of the biodegradable plastics does not cause an increase in the amount of carbon dioxide in the air. This is referred to as carbon neutral. Under the Kyoto Protocol that sets targets for reducing carbon dioxide, importance is placed on the carbon neutral, and this has led to the desire for active use of biodegradable plastics of plant origin.

From the viewpoint of biodegradability and carbon neutrality, aliphatic polyester-based resins are receiving attention as the biodegradable plastics of plant origin. In particular, attention is given to polyhydroxyalkanoate-based resins (hereinafter may be referred to as PHA-based resins). Among the PHA-based resins, particular attention is given to poly(3-hydroxybutyrate) homopolymer resins (hereinafter referred to as PHB), poly(3-hydroxybutyrate-co-3-hydroxyvalerate) copolymer resins (hereinafter may be referred to as PHBV), poly(3-hydroxybutyrate-co-3-hydroxyhexanoate) copolymer resins (hereinafter may be referred to as PHBH), poly(3-hydroxybutyrate-co-4-hydroxybutyrate) copolymer resins, polylactic acid, etc.

PTL 1 discloses a molded article formed of an aliphatic polyester resin composition containing a polyhydroxyalkanoate, an amide bond-containing compound, and pentaerythritol. It is stated that molding workability during injection molding or sheet forming is improved.

Polyhydroxyalkanoates have high biodegradability, therefore decompose rapidly after use, and do not need to be incinerated, and various applications of these resins (such as food packaging materials) are being developed.

PTL 2 discloses a laminate that has heat resistance and is biodegradable after use. More particularly, PTL 2 discloses a biodegradable laminate in which a modified polyester-based resin prepared by graft-modifying polybutylene succinate (hereinafter referred to as PBS) or polybutylene adipate terephthalate (hereinafter may be referred to as PBAT) with maleic anhydride is used as a bonding layer between an aliphatic polyester-based resin layer including polylactic acid and a polyvinyl alcohol-based resin layer.

PTL 3 discloses a laminate sheet in which a polylactic acid resin layer and a barrier layer formed of an ethylene-vinyl alcohol copolymer are bonded using a modified polyolefin-based resin.

PTL 1: International Publication No. WO2014/068943
PTL 2: International Publication No. WO2013/069726
PTL 3: International Publication No. WO2017/069127

The recent social trend toward stronger protection of the natural environment has led to the desire for biodegradable resins that are not partially biodegradable but are completely biodegradable. As for the environment of biodegradation, there is a desire not only for biodegradability in an aerobic composting environment at relatively high temperature (58° C. or higher) but also for biodegradability in an aerobic composting environment at room temperature (28° C.). When biodegradable resins exhibiting biodegradability at room temperature are used to form, for example, sheets and containers, specifically, household packaging materials, tableware, etc., they can be treated by home composting.

PTL 1 to PTL 3 show examples of the use of biodegradable resins. However, in the proposed molded articles and laminates, the rate of biodegradation at room temperature is low, and the recent requirements are not satisfied.

In the laminates described in PTL 2 and PTL 3, their permeability to oxygen and water vapor is high, so that the laminates cannot be used for packaging material sheets and containers for foods (such as coffee) that deteriorate in oxygen.

SUMMARY OF INVENTION

The present invention has been made in view of the foregoing circumstances, and it is an object to provide a biodegradable laminate that has a higher biodegradation rate at room temperature than conventional biodegradable laminates, is excellent in moldability when the biodegradable laminate is obtained, has characteristics such as impact resistance and heat resistance, and also has a water vapor barrier property and an oxygen barrier property when the biodegradable laminate is formed into sheets and containers.

Solution to Problem

The present inventors have found that, while a high biodegradation rate at room temperature is achieved, mechanical properties such as impact resistance, heat resistance, a water vapor barrier property, and an oxygen barrier property can be improved in a well-balanced manner by using, as a constituent material of an aliphatic polyester resin layer of a biodegradable laminate in which a polyvinyl alcohol-based resin layer is laminated on at least one surface of the aliphatic polyester-based resin layer with a bonding layer therebetween, an aliphatic polyester-based resin composition containing an aliphatic polyester-based resin (A) including a repeating unit derived from an aliphatic diol and a repeating unit derived from an aliphatic dicarboxylic acid as main constituent units, a polyhydroxyalkanoate (B) including a 3-hydroxybutyrate unit as a main constituent unit, and an inorganic filler (C). Thus, the inventors have arrived at the present invention.

The inventors have also found that an adhesive resin composition including a modified polyester-based resin (D) obtained by graft-modifying a polyester-based resin (d) mainly containing an aliphatic polyester-based resin (A) and/or an aliphatic-aromatic polyester-based resin with an α, β-unsaturated carboxylic acid and/or an anhydride thereof has high biodegradability, can exhibit adhesion, and is optimal for a resin for a bonding layer used for a biodegradable resin laminate.

The present invention is summarized in the following [1] to [5].

[1] A biodegradable laminate comprising: an aliphatic polyester-based resin layer; a bonding layer; and a polyvinyl alcohol-based resin layer laminated on at least one surface of the aliphatic polyester-based resin layer with the bonding layer therebetween, wherein the aliphatic polyester-based resin layer includes an aliphatic polyester-based resin composition containing an aliphatic polyester-based resin (A) including a repeating unit derived from an aliphatic diol and a repeating unit derived from an aliphatic dicarboxylic acid as main constituent units, a polyhydroxyalkanoate (B) including a 3-hydroxybutyrate unit as a main constituent unit, and an inorganic filler (C).

[2] The biodegradable laminate according to [1], wherein the mass ratio of the aliphatic polyester-based resin (A) to the polyhydroxyalkanoate (B) contained in the aliphatic polyester-based resin composition is 75/25 to 10/90.

[3] The biodegradable laminate according to [1] or [2], wherein the presence ratio of the inorganic filler (C) relative to the total amount of the aliphatic polyester-based resin (A), the polyhydroxyalkanoate (B), and the inorganic filler (C) in the aliphatic polyester-based resin composition is 15 to 50% by mass.

[4] The biodegradable laminate according to any one of [1] to [3], wherein the inorganic filler (C) is one or two or more selected from the group consisting of talc, calcium carbonate, zeolite, mica, and clay.

[5] An adhesive resin composition comprising a modified polyester-based resin (D) containing a product obtained by graft-modifying a polyester-based resin (d) mainly containing an aliphatic polyester-based resin (A) and/or an aliphatic-aromatic polyester-based resin with an α, β-unsaturated carboxylic acid and/or an anhydride thereof.

Advantageous Effects of Invention

The present invention provides a biodegradable laminate that has a high biodegradation rate at room temperature, is excellent in moldability when the biodegradable laminate is obtained, has characteristics such as impact resistance and heat resistance, and also has a water vapor barrier property and an oxygen barrier property when the biodegradable laminate is formed into sheets and containers.

The biodegradable laminate of the present invention has the oxygen/water vapor barrier properties and has a high biodegradation rate even under a room temperature condition, and it is expected that the biodegradable laminate can be preferably used for packaging materials for coffee and containers for food applications such as coffee capsules.

BRIEF DESCRIPTION OF DRAWINGS

FIG. 1 is an illustration showing a die for vacuum forming in Examples.

DESCRIPTION OF EMBODIMENTS

Embodiments of the present invention will next be described in detail. However, the present invention is not limited to the following description and can be embodied in various modified forms without departing from the scope of the invention.

In the present description, an expression including "to" between numerical values or physical property values is used to indicate a range including these values sandwiching "to."

In the present description, "% by mass" is the same as "parts by mass," and "% by weight" is the same as "parts by weight."

The biodegradable laminate of the present invention includes: an aliphatic polyester-based resin layer; a bonding layer; and a polyvinyl alcohol-based resin layer (hereinafter may be referred to as a "PVA-based resin layer" stacked on at least one surface of the aliphatic polyester-based resin layer with the bonding layer therebetween. The aliphatic polyester-based resin layer includes an aliphatic polyester-based resin composition (hereinafter may be referred to as an "aliphatic polyester-based resin composition" in the present invention) containing an aliphatic polyester-based resin (A) including a repeating unit derived from an aliphatic diol and a repeating unit derived from an aliphatic dicarboxylic acid as main constituent units, a polyhydroxyalkanoate (B) including a 3-hydroxybutyrate unit as a main constituent unit, and an inorganic filler (C).

[Mechanism]

The aliphatic polyester-based resin (A) and the polyhydroxyalkanoate (B) contained in the aliphatic polyester-based resin composition in the present invention have high biodegradability at room temperature. Therefore, the biodegradable laminate of the present invention including the aliphatic polyester-based resin layer including the aliphatic polyester-based resin composition in the present invention containing the aliphatic polyester-based resin (A) and the polyhydroxyalkanoate (B) as resin components is excellent in biodegradability.

By using the aliphatic polyester-based resin (A) and the polyhydroxyalkanoate (B) in combination at a prescribed mixing ratio, moldability can be improved.

A sufficient water vapor barrier property and a sufficient oxygen barrier property cannot be obtained by using only the aliphatic polyester-based resin (A) and the polyhydroxyalkanoate (B). However, the biodegradable laminate of the present invention includes the PVA-based resin layer, and the aliphatic polyester-based resin composition in the present invention contains the inorganic filler (C). The presence of the inorganic filler (C) further improves the water vapor barrier property and the oxygen barrier property.

When the inorganic filler (C) is added, the surface area of a molded article increases. Moreover, as biodegradation proceeds, the inorganic filler (C) falls off, and the area of contact with degrading enzymes produced by microorganisms increases, so that the effect of increasing the biodegradation rates of the aliphatic polyester-based resin (A) and the polyhydroxyalkanoate (B) is obtained.

The inorganic filler (C) functions as a nucleating agent and acts effectively in improving moldability. Therefore, when the inorganic filler (C) is contained, the biodegradable laminate excellent in biodegradability can be provided with good moldability and productivity.

[Aliphatic Polyester-Based Resin Composition]

A description will next be given of the aliphatic polyester-based resin composition in the present invention containing the aliphatic polyester-based resin (A), the polyhydroxyalkanoate (B), and the inorganic filler (C).

In the present invention, the aliphatic diol is a compound in which two hydroxy groups are bonded to an aliphatic hydrocarbon group. The aliphatic hydrocarbon group used is generally a liner aliphatic hydrocarbon group but may have a branched structure, may have a cyclic structure, and may have a plurality of these structures.

The aliphatic dicarboxylic acid is a compound in which two carboxyl groups are bonded to an aliphatic hydrocarbon group. The aliphatic hydrocarbon group used is generally a linear aliphatic hydrocarbon group, but may have a branched structure, may have a cyclic structure, and may have a plurality of these structures.

The aliphatic polyester-based resin (A) contained in the aliphatic polyester-based resin composition in the present invention is a polymer having repeating units. Each of the repeating units is derived from a specific compound and referred to as a compound unit of this compound. For example, a repeating unit derived from an aliphatic diol is referred to as an "aliphatic diol unit," and a repeating unit derived from an aliphatic dicarboxylic acid is referred to as an "aliphatic dicarboxylic acid unit."

The "main constituent units" in the aliphatic polyester-based resin (A) are generally constituent units contained in the aliphatic polyester-based resin (A) in a total amount of 80% by mass or more. The aliphatic polyester-based resin (A) may not contain a constituent unit other than the main constituent units at all. This is also the case for the "main constituent unit" in the polyhydroxyalkanoate (B) and for the "main constituent units" in a polyester-based resin (d) described later.

<Aliphatic Polyester-Based Resin (A)>

The aliphatic polyester-based resin (A) is an aliphatic polyester-based resin including an aliphatic diol unit and an aliphatic dicarboxylic acid unit as main constituent units.

In the polyester-based resin (A), the ratio of a succinic acid unit to all dicarboxylic acid units is preferably from 5% by mole to 100% by mole inclusive. The polyester-based resin (A) may be a mixture of aliphatic polyester-based resins containing different amounts of the succinic acid unit. For example, an aliphatic polyester-based resin not containing aliphatic dicarboxylic acid units other than succinic acid (containing only the succinic acid unit as the aliphatic dicarboxylic acid unit) and an aliphatic polyester-based resin containing an aliphatic dicarboxylic acid unit other than succinic acid may be mixed such that the amount of the succinic acid unit in the polyester-based resin (A) used is adjusted within the above preferred range.

Specifically, the polyester-based resin (A) is a polyester-based resin including an aliphatic diol unit represented by the following formula (1) and an aliphatic dicarboxylic acid unit represented by the following formula (2).

$$—O—R^a—O—  \quad (1)$$

$$—OC—R^b—CO—  \quad (2)$$

In formula (1), $R^a$ represents a divalent aliphatic hydrocarbon group. In formula (2), $R^b$ represents a divalent aliphatic hydrocarbon group. The aliphatic diol unit and the aliphatic dicarboxylic acid unit represented by formulas (1) and (2) may be derived from compounds derived from petroleum, may be derived from compounds derived from plant raw materials, but are preferably derived from compounds derived from plant raw materials.

When the polyester-based resin (A) is a copolymer, the polyester-based resin (A) may contain two or more aliphatic diol units represented by formula (1) or may contain two or more aliphatic dicarboxylic acid units represented by formula (2).

Preferably, the aliphatic dicarboxylic acid unit represented by formula (2) includes a succinic acid unit in an amount of from 5% by mole to 100% by mole inclusive based on the total amount of dicarboxylic acid units. When the amount of the succinic acid unit in the polyester-based resin (A) is in the above prescribed range, degradability and moldability of the biodegradable laminate obtained are improved, and the biodegradable laminate can have good heat resistance. For the same reason, the amount of the succinic acid unit in the polyester-based resin (A) is preferably 10% by mole or more, more preferably 50% by mole or more, still more preferably 64% by mole or more, and particularly preferably 68% by mole based on the total amount of the dicarboxylic acid units.

The ratio of the amount of the succinic acid unit to the total amount of the dicarboxylic acid units in the polyester-based resin (A) may be hereinafter referred to as the "amount of the succinic acid unit."

More preferably, the aliphatic dicarboxylic acid unit represented by formula (2) includes, in addition to succinic acid, at least one aliphatic dicarboxylic acid unit in an amount of from 5% by mole to 50% by mole inclusive based on the total amount of the dicarboxylic acid units. By using the aliphatic dicarboxylic acid unit other than succinic acid in an amount within the above prescribed range for copolymerization, the crystallization temperature of the polyester-based resin (A) can be reduced, and therefore the biodegradation rate can be increased. For the same reason, the amount of the aliphatic dicarboxylic acid unit other than succinic acid in the polyester-based resin (A) is preferably from 10% by mole to 45% by mole inclusive and more preferably from 15% by mole and 40% by mole inclusive based on the total amount of the dicarboxylic acid units.

No particular limitation is imposed on the aliphatic diol that provides the diol unit represented by formula (1) From the viewpoint of moldability and mechanical strength, the aliphatic diol is preferably an aliphatic diol having 2 to 10 carbon atoms and particularly preferably an aliphatic diol having 4 to 6 carbon atoms. Examples of such an aliphatic diol include ethylene glycol, 1,3-propanediol, 1,4-butanediol, and 1,4-cyclohexanedimethanol. Of these, 1,4-butanediol is particularly preferable. Two or more aliphatic diols may be used.

No particular limitation is imposed on the aliphatic dicarboxylic acid component that provides the aliphatic dicarboxylic acid unit represented by formula (2). The aliphatic dicarboxylic acid component is preferably an aliphatic dicarboxylic acid having 2 to 40 carbon atoms or a derivative thereof such as an alkyl ester and particularly preferably an aliphatic dicarboxylic acid having 4 to 10 carbon atoms or a derivative thereof such as an alkyl ester. Examples of the aliphatic dicarboxylic acid other than succinic acid and having 4 to 10 carbon atoms and derivatives thereof such as alkyl esters thereof include adipic acid, suberic acid, sebacic acid, dodecanedioic acid, dimer acid, and derivatives thereof such as alkyl esters thereof. Of these, adipic acid, sebacic acid, and azelaic acid are preferred, and adipic acid is particularly preferred. Two or more aliphatic dicarboxylic acid components may be used. In this case, a combination of succinic acid and adipic acid is preferred.

The polyester-based resin (A) may have a repeating unit derived from an aliphatic oxycarboxylic acid (an aliphatic oxycarboxylic acid unit). Specific examples of the aliphatic oxycarboxylic acid component that provides the aliphatic oxycarboxylic acid unit include lactic acid, glycolic acid, 2-hydroxy-n-butyric acid, 2-hydroxycaproic acid, 6-hydroxycaproic acid, 2-hydroxy-3,3-dimethylbutyric acid, 2-hydroxy-3-methylbutyric acid, 2-hydroxyisocaproic acid, derivatives thereof such as lower alkyl esters thereof and intramolecular esters thereof. When they have optical isomers, any of a D-form, an L-form, and a racemate may be used. The aliphatic oxycarboxylic acid component may be in the form of a solid, a liquid, or an aqueous solution. Of these, lactic acid, glycolic acid, and derivatives thereof are particularly preferred. One of the aliphatic oxycarboxylic acids may be used alone, or a mixture of two or more may be used.

When the polyester-based resin (A) includes any of these aliphatic oxycarboxylic acid units, the content thereof with the total amount of all the constituent units forming the polyester-based resin (A) set to 100% by mole is preferably 20% by mole or less, more preferably 10% by mole or less, still more preferably 5% by mole or less, and most preferably 0% by mole (the polyester-based resin (A) includes no aliphatic oxycarboxylic acid unit), from the viewpoint of moldability.

The polyester-based resin (A) may be prepared by copolymerizing a trifunctional or higher-functional aliphatic polyol with a trifunctional or higher-functional aliphatic polyvalent carboxylic acid, an acid anhydride thereof, or a trifunctional or higher-functional aliphatic polyvalent oxycarboxylic acid component, in order to increase melt viscosity.

Specific examples of the trifunctional aliphatic polyol include trimethylolpropane and glycerin, and specific examples of the tetrafunctional aliphatic polyol include pentaerythritol. One of them may be used alone, or a mixture of two or more may be used.

Specific examples of the trifunctional aliphatic polyvalent carboxylic acid and the acid anhydride thereof include propanetricarboxylic acid and acid anhydrides thereof, and specific examples of the tetrafunctional polyvalent carboxylic acid and the acid anhydride thereof include cyclopentanetetracarboxylic acid and acid anhydrides thereof. One of them may be used alone, or a mixture of two or more may be used.

The trifunctional aliphatic oxycarboxylic acids are classified into (i) a type in which two carboxyl groups and one hydroxyl group are present in one molecule and (ii) a type in which one carboxyl group and two hydroxyl groups are present in one molecule. Any of these types may be used. From the viewpoint of moldability, mechanical strength, and the appearance of a molded article, (i) the type in which two carboxyl groups and one hydroxyl group are present in one molecule, such as malic acid, is preferred, and, more particularly, malic acid is used preferably.

The tetrafunctional aliphatic oxycarboxylic acid components are classified into (i) a type in which three carboxyl groups and one hydroxyl group are present in one molecule, (ii) a type in which two carboxyl groups and two hydroxyl groups are present in one molecule, and (iii) a type in which three hydroxyl groups and one carboxyl group are present in one molecule. Any of these types can be used. It is preferable to use a tetrafunctional aliphatic oxycarboxylic acid component having a plurality of carboxyl groups, and more specific examples include citric acid and tartaric acid. One of them may be used alone, or a mixture of two or more may be used.

When the polyester-based resin (A) includes a constituent unit derived from the above-described trifunctional or higher-functional component, the lower limit of the content thereof with the total amount of all the constituent units forming the aliphatic polyester-based resin (A) set to 100% by mole is generally 0% by mole or more and preferably 0.01% by mole or more, and the upper limit is generally 5% by mole or less and preferably 2.5% by mole or less.

To produce the aliphatic polyester-based resin (A), a well-known polyester production method can be used. In this case, no particular limitation is imposed on the polycondensation reaction, and appropriate conditions conventionally used may be used. Generally, a method including allowing the esterification reaction to proceed and performing a pressure-reducing operation to further increase the degree of polymerization is used.

When the diol component forming the diol unit is reacted with the dicarboxylic acid component forming the dicarboxylic acid unit to produce the aliphatic polyester-based resin (A), the amount of the diol component used and the amount of the dicarboxylic acid component used are set such that the aliphatic polyester-based resin (A) to be produced has an intended composition. Generally, the diol component is reacted with substantially an equimolar amount of the dicarboxylic acid component. However, since the diol component is distilled during the esterification reaction, the diol component is generally used in an amount larger by 1 to 20% by mole than the amount of the dicarboxylic acid component.

When the aliphatic polyester-based resin (A) contains components (optional components) other than the essential components, such as the aliphatic oxycarboxylic acid unit and the polyfunctional component, compounds (monomers or oligomers) corresponding to the aliphatic oxycarboxylic acid unit and the polyfunctional component unit are reacted such that an intended composition is obtained. In this case, no particular limitation is imposed on the timing at which the optional components are introduced into the reaction system and the method for introducing the optional components. The timing and the method can be freely selected so long as an aliphatic polyester-based resin (A) preferable for the present invention can be produced.

For example, no particular limitation is imposed on the timing and method for introducing the aliphatic oxycarboxylic acid into the reaction system so long as the aliphatic oxycarboxylic acid is introduced before the diol component and the dicarboxylic acid component are subjected to the polycondensation reaction. Examples of the method include (1) a method in which an aliphatic oxycarboxylic acid solution with a catalyst dissolved therein in advance is mixed and (2) a method in which the aliphatic oxycarboxylic acid is mixed simultaneously with introduction of the catalyst into the reaction system at the time of charging of the raw materials.

As for the timing for introducing the compound forming the polyfunctional component unit, the compound may be charged together with other monomers or oligomers at the beginning of polymerization or may be charged after transesterification but before the start of pressure reduction. Preferably, from the viewpoint of simplification of the process, the compound is charged together with the other monomers or oligomers.

Generally, the aliphatic polyester-based resin (A) is produced in the presence of a catalyst. Any of catalysts that can be used to produce well-known polyester-based resins can be freely selected so long as the effects of the present invention are not significantly impaired. Preferred examples of the catalyst include compounds of metals such as germanium, titanium, zirconium, hafnium, antimony, tin, magnesium, calcium, and zinc. Of these, germanium compounds and titanium compounds are preferred.

Examples of the germanium compounds that can be used as the catalyst include organic germanium compounds such as tetraalkoxy germanium and inorganic germanium compounds such as germanium oxide and germanium chloride. Of these, from the viewpoint of cost and availability, germanium oxide, tetraethoxy germanium, tetrabutoxy germanium, etc. are preferred, and germanium oxide is particularly preferred.

Examples of the titanium compounds that can be used as the catalyst include organic titanium compounds such as tetraalkoxy titaniums such as tetrapropyl titanate, tetrabutyl titanate, and tetraphenyl titanate. Of these, from the viewpoint of cost and availability, tetrapropyl titanate, tetrabutyl titanate, etc. are preferred.

Another catalyst may be used in combination so long as the object of the present invention is not impaired.

One of these catalysts may be used alone, or any combination of two or more may be used at any ratio.

The catalyst may be used in any amount so long as the effects of the present invention are not significantly impaired. The amount of the catalyst relative to the amount of the monomers used is generally 0.0005% by mass or more and more preferably 0.001% by mass or more and is generally 3% by mass or less and preferably 1.5% by mass or less. If the amount of the catalyst is lower than the lower limit in the above range, the effect of the catalyst may not be obtained. If the amount of the catalyst is higher than the upper limit in the above range, the cost of production may increase, and the polymer obtained may be colored significantly. Moreover, a reduction in hydrolysis resistance may occur.

No particular limitation is imposed on the timing for introducing the catalyst so long as the catalyst is introduced before the polycondensation reaction. The catalyst may be introduced at the time of charging of the raw materials or before the start of pressure reduction. When the aliphatic oxycarboxylic acid unit is introduced into the aliphatic polyester-based resin (A), it is preferable to use a method in which the catalyst is introduced together with a monomer or oligomer forming the aliphatic oxycarboxylic acid unit such as lactic acid or glycolic acid at the time of charging of the raw materials or a method in which the catalyst dissolved in an aqueous aliphatic oxycarboxylic acid solution is introduced. It is particularly preferable to use the method in which the catalyst dissolved in the aqueous aliphatic oxycarboxylic acid solution is introduced because the rate of polymerization increases.

The reaction conditions such as temperature, polymerization time, and pressure when the aliphatic polyester-based resin (A) is produced are freely set so long as the effects of the present invention are not significantly impaired. The lower limit of the reaction temperature of the esterification reaction and/or transesterification of the dicarboxylic acid component and the diol component is generally 150° C. or higher and preferably 180° C. or higher, and the upper limit is generally 260° C. or lower and preferably 250° C. or lower. The reaction atmosphere is generally an inert atmosphere such as nitrogen or argon. The reaction pressure is generally normal atmospheric pressure to 10 kPa and is preferably normal atmospheric pressure. The lower limit of the reaction time is 1 hour or longer, and the upper limit is generally 10 hours of shorter, preferably 6 hours or shorter, and more preferably 4 hours or shorter.

If the reaction temperature is excessively high, unsaturated bonds are generated excessively. In this case, gelation due to the unsaturated bonds may occur, so that it may be difficult to control the polymerization.

Preferably, the polycondensation reaction after the esterification reaction and/or transesterification of the dicarboxylic acid component and the diol component is performed in a vacuum. As for the degree of vacuum, the lower limit of the pressure of the vacuum is generally $0.01 \times 10^3$ Pa or higher and preferably $0.03 \times 10^3$ Pa or higher, and the upper limit is generally $1.4 \times 10^3$ Pa or lower and preferably $0.4 \times 10^3$ Pa or lower. The lower limit of the reaction temperature in this case is generally 150° C. or higher and preferably 180° C. or higher, and the upper limit is generally 260° C. or lower and preferably 250° C. or lower. The lower limit of the reaction time is generally 2 hours or longer, and the upper limit is generally 15 hours or shorter and preferably 10 hours or shorter.

If the reaction temperature is excessively high, unsaturated bonds are generated excessively. In this case, gelation due to the unsaturated bonds may occur, so that it may be difficult to control the polymerization.

To produce the aliphatic polyester-based resin (A), a chain extender such as a carbonate compound or a diisocyanate compound may be used. In this case, the amount of the chain extender, i.e., the ratio of carbonate bonds or urethane bonds in the polyester-based resin (A) with the total amount of all the constituent units forming the aliphatic polyester-based resin (A) set to 100% by mole, is generally 10% by mole or less, preferably 5% by mole or less, and more preferably 3% by mole or less. However, when urethane bonds or carbonate bonds are present in the aliphatic polyester-based resin (A), there is a possibility that the biodegradability may be impaired. Therefore, in the present invention, the amount of the carbonate bonds based on the total amount of all the constituent units forming the aliphatic polyester-based resin (A) is less than 1% by mole, preferably 0.5% by mole or less, and more preferably 0.1% by mole or less, and the amount of the urethane bonds is 0.55% by mole or less, preferably 0.3% by mole or less, more preferably 0.12% by mole or less, and still more preferably 0.05% by mole or less. This amount in terms of parts by mass based on 100 parts by mass of the aliphatic polyester-based resin (A) is 0.9 parts by mass or less, preferably 0.5 parts by mass or less, more preferably 0.2 parts by mass or less, and still more preferably 0.1 parts by mass or less. In particular, if the amount of the urethane bonds is higher than the above upper limit, the urethane bonds may dissociate in a film formation process etc., and smoke and odors from a molten film through an outlet of a die may cause a problem. Moreover, foaming in the molten film may cause the film to be cut, so that the film may not be formed stably.

The amount of the carbonate bonds and the amount of the urethane bonds in the aliphatic polyester-based resin (A) can be determined by computation using the results of NMR measurement such as $^1$H-NMR measurement or $^{13}$C-NMR measurement.

Specific examples of the carbonate compound used as the chain extender include diphenyl carbonate, ditolyl carbonate, bis(chlorophenyl)carbonate, m-cresyl carbonate, dinaphthyl carbonate, dimethyl carbonate, diethyl carbonate, dibutyl carbonate, ethylene carbonate, diamyl carbonate, and dicyclohexyl carbonate. Moreover, carbonate compounds derived from hydroxy compounds such as phenols and alcohols and including one or different types of hydroxy compounds are also usable.

Specific examples of the diisocyanate compound include well-known diisocyanates such as 2,4-tolylene diisocyanate, a mixture of 2,4-tolylene diisocyanate and 2,6-tolylene diisocyanate, 1,5-naphthylene diisocyanate, xylene diisocyanate, hydrogenated xylylene diisocyanate, hexamethylene diisocyanate, isophorone diisocyanate, 4,4'-dicyclohexylmethane diisocyanate, tetramethylxylylene diisocyanate, 2,4,6-triisopropylphenyl diisocyanate, 4,4'-diphenylmethane diisocyanate, and tolidine diisocyanate.

Moreover, dioxazoline, silicic acid esters, etc. may be used as additional chain extenders.

Specific examples of the silicic acid esters include tetramethoxysilane, dimethoxydiphenylsilane, dimethoxydimethylsilane, and diphenyldihydroxysilane.

A high-molecular weight polyester-based resin using any of these chain extenders (coupling agents) can be produced using a conventional technique. The chain extender in a homogeneously molten state is added to the reaction system without using a solvent after completion of polycondensation and is reacted with the polyester obtained by the polycondensation.

More specifically, a polyester-based resin having an increased molecular weight can be obtained by reacting the chain extender with a polyester that is obtained by a catalytic reaction of the diol component and the dicarboxylic acid component, has substantially a hydroxyl group as a terminal group, and has a weight average molecular weight (Mw) of 20,000 or more and preferably 40,000 or more. With a prepolymer having a weight average molecular weight of 20,000 or more together with the use of a small amount of the chain extender, a high-molecular weight polyester-based resin can be produced even under severe conditions such as a molten state because the prepolymer is not influenced by the remaining catalyst. The weight average molecular weight (Mw) of the polyester-based resin is determined as a value converted using monodispersed polystyrenes from a measurement value by gel permeation chromatography (GPC) using chloroform as a solvent at a measurement temperature of 40° C.

When, for example, the above diisocyanate compound serving as the chain extender is used to further increase the molecular weight of the polyester-based resin, it is preferable to use a prepolymer having a weight average molecular weight of 20,000 or more and preferably 40,000 or more. If the weight average molecular weight of the prepolymer is less than 20,000, the amount of the diisocyanate compound used to increase the molecular weight increases, and this may cause a reduction in heat resistance. When the above prepolymer is used, a polyester-based resin having urethane bonds derived from the diisocyanate compound and having a linear structure in which prepolymer molecules are linked through the urethane bonds is produced.

The pressure during chain extension is generally from 0.01 MPa to 1 MPa inclusive, preferably from 0.05 MPa to 0.5 MPa inclusive, and more preferably from 0.07 MPa to 0.3 MPa inclusive and is most preferably normal atmospheric pressure.

The lower limit of the reaction temperature during chain extension is generally 100° C. or higher, preferably 150° C. or higher, more preferably 190° C. or higher, and most preferably 200° C. or higher, and the upper limit is generally 250° C. or lower, preferably 240° C. or lower, and more preferably 230° C. or lower. If the reaction temperature is excessively low, the viscosity is high, and it is difficult for the reaction to proceed uniformly. Moreover, a high stirring power tends to be required. If the reaction temperature is excessively high, gelation and decomposition of the polyester-based resin tend to occur.

The lower limit of the chain extension time is generally 0.1 minutes or longer, preferably 1 minute or longer, and more preferably 5 minutes or longer, and the upper limit is 5 hours or shorter, preferably 1 hour or shorter, more preferably 30 minutes or shorter, and most preferably 15 minutes or shorter. If the chain extension time is excessively short, the effect of the addition of the chain extender tends not to be obtained. If the chain extension time is excessively long, the gelation and decomposition of the polyester-based resin tend to occur.

As for the molecular weight of the aliphatic polyester-based resin (A), its weight average molecular weight (Mw) determined from a measurement value by gel permeation chromatography (GPC) using monodispersed polystyrene reference materials is generally from 10,000 to 1,000,000 inclusive. The weight average molecular weight (Mw) of the aliphatic polyester-based resin (A) is preferably from 20,000 to 500,000 inclusive and more preferably from 50,000 to 400,000 inclusive because such a weight average molecular weight is advantageous in terms of moldability and mechanical strength.

The melt flow rate (MFR) of the aliphatic polyester-based resin (A) that is measured at 190° C. and a load of 2.16 kg according to JIS K7210 (1999) is generally from 0.1 g/10 minutes to 100 g/10 minutes inclusive. From the viewpoint of moldability and mechanical strength, the MFR of the aliphatic polyester-based resin (A) is preferably 50 g/10 minutes or less and particularly preferably 30 g/10 minutes or less. The MFR of the aliphatic polyester-based resin (A) can be controlled by changing its molecular weight.

The melting point of the aliphatic polyester-based resin (A) is preferably 70° C. or higher and more preferably 75° C. or higher and is preferably 170° C. or lower, more preferably 150° C. or lower, and particularly preferably lower than 130° C. When the aliphatic polyester-based resin (A) has a plurality of melting points, it is preferable that at least one of the melting points falls within the above range.

The elastic modulus of the aliphatic polyester-based resin (A) is preferably 180 to 1000 MPa.

If the melting point is outside the above range, the moldability is poor. If the elastic modulus is less than 180 MPa, problems tend to occur in moldability, processability, and shape retainability. If the elastic modulus exceeds 1000 MPa, impact resistance deteriorates.

No particular limitation is imposed on the methods for adjusting the melting point and elastic modulus of the aliphatic polyester-based resin (A). The melting point and the elastic modulus can be adjusted, for example, by selecting the type of copolymerizing component of the aliphatic dicarboxylic acid component other than succinic acid, adjusting the copolymerizing ratio, or combining them.

The aliphatic polyester resin (A) used may be a commercial product. "BioPBS (registered trademark) FZ71PB," "BioPBS (registered trademark) FZ71PB," "BioPBS (registered trademark) FZ71PM," "BioPBS (registered trademark) FZ91PB," "BioPBS (registered trademark) FZ91PM," "BioPBS (registered trademark) FD92PB," and "BioPBS (registered trademark) FD92PM" all manufactured by PTTMCC Biochem can be used.

The number of aliphatic polyester resins (A) used is not limited to one, and two or more aliphatic polyester resins (A) that differ in types of constituent units, the ratio of the constituent units, production method, physical properties, etc. may be mixed and used.

<Polyhydroxyalkanoate (B)>

The polyhydroxyalkanoate (hereinafter may be referred to as PHA) (B) is an aliphatic polyester including a repeating unit represented by a general formula: [—CHR—CH$_2$—CO—O—] (wherein R is an alkyl group having 1 to 15 carbon atoms) and includes a 3-hydroxybutyrate unit as a main structural component.

From the viewpoint of moldability and heat resistance, the polyhydroxyalkanoate (B) includes, as a constituent unit, the 3-hydroxybutyrate unit in an amount of preferably 80% by mole or more and preferably 85% by mole or more. Preferably, the polyhydroxyalkanoate (B) is produced by microorganisms.

Specific examples of the polyhydroxyalkanoate (B) include poly(3-hydroxybutyrate) homopolymer resins, poly (3-hydroxybutyrate-co-3-hydroxypropionate) copolymer resins, poly(3-hydroxybutyrate-co-3-hydroxyvalerate) copolymer resins, poly(3-hydroxybutyrate-co-3-hydroxyvalerate-co-3-hydroxyhexanoate) copolymer resins, poly(3-hydroxybutyrate-co-3-hydroxyhexanoate) copolymer resins, poly(3-hydroxybutyrate-co-3-hydroxyheptanoate) copolymer resins, poly(3-hydroxybutyrate-co-3-hydroxyoctanoate) copolymer resins, poly(3-hydroxybutyrate-co-3-hydroxynonanoate) copolymer resins, poly(3-hydroxybutyrate-co-3-hydroxydecanoate) copolymer resins, poly(3-hydroxybutyrate-co-3-hydroxyundecanoate) copolymer resins, and poly(3-hydroxybutyrate-co-4-hydroxybutyrate) copolymer resins.

From the viewpoint of moldability, processability, and the biodegradable laminate to be obtained, the polyhydroxyalkanoate (B) is preferably a poly(3-hydroxybutyrate) homopolymer resin, a poly(3-hydroxybutyrate-co-3-hydroxyvalerate) copolymer resin, a poly(3-hydroxybutyrate-co-3-hydroxyvalerate-co-3-hydroxyhexanoate) copolymer resin, a poly(3-hydroxybutyrate-co-3-hydroxyhexanoate) copolymer resin, or a poly(3-hydroxybutyrate-co-4-hydroxybutyrate) copolymer resin and is particularly preferably a poly(3-hydroxybutyrate-co-3-hydroxyhexanoate) copolymer resin.

In the polyhydroxyalkanoate (B), the constituent ratio of 3-hydroxybutyrate (hereinafter may be referred to as 3HB) to a copolymerized comonomer such as 3-hydroxyhexanoate (hereinafter referred to as 3HH), i.e., the monomer ratio in the copolymer resin, is preferably 3-hydroxybutyrate/comonomer=97/3 to 80/20 (% by mole/% by mole) and more preferably 95/5 to 85/15 (% by mole/% by mole), from the viewpoint of moldability, processability, the quality of a molded article, etc. If the comonomer ratio is less than 3% by mole, the molding temperature is close to thermal decomposition temperature, and it may be difficult to perform molding. If the comonomer ratio exceeds 20% by mole, crystallization of the polyhydroxyalkanoate (B) slows down, so that the productivity may deteriorate.

The ratios of the monomers in the polyhydroxyalkanoate (B) can be measured by gas chromatography as follows.

2 mL of a sulfuric acid/methanol mixture (15/85 (mass ratio)) and 2 mL of chloroform are added to about 20 mg of dry PHA, and the resulting mixture is hermetically sealed and heated at 100° C. for 140 minutes to thereby obtain a methyl ester of a PHA decomposition product. After cooling, 1.5 g of sodium hydrogencarbonate is gradually added to the methyl ester for neutralization, and the mixture is left to stand until generation of carbon dioxide gas is stopped. Then 4 mL of diisopropyl ether is added, and the mixture is well mixed. The composition of the monomer units of the PHA decomposition product in the supernatant is analyzed by capillary gas chromatography to thereby determine the ratios of the monomers in the copolymer resin.

The weight average molecular weight (hereinafter may be referred to as Mw) of the polyhydroxyalkanoate (B) is determined from a measurement value by gel permeation chromatography (GPC) using monodispersed polystyrene reference materials and is generally from 200,000 to 2,500,000 inclusive. The weight average molecular weight (Mw) of the polyhydroxyalkanoate (B) is preferably from 250,000 to 2,000,000 inclusive and more preferably from 300,000 to 1,000,000 inclusive because such a weight average molecular weight is advantageous in terms of moldability and mechanical strength. If the weight average molecular weight is less than 200,000, the mechanical properties etc. may be poor. If the weight average molecular weight exceeds 2,500,000, it may be difficult to perform molding.

The melt flow rate (MFR) of the polyhydroxyalkanoate (B) that is measured at 190° C. and a load of 2.16 kg according to JIS K7210 (1999) is preferably from 1 g/10 minutes to 100 g/10 minutes inclusive. From the viewpoint of moldability and mechanical strength, the MFR of the polyhydroxyalkanoate (B) is more preferably 50 g/10 minutes or less and particularly preferably 30 g/10 minutes or less. The MFR of the polyhydroxyalkanoate (B) can be controlled by changing its molecular weight.

The melting point of the polyhydroxyalkanoate (B) is preferably 120° C. or higher and more preferably 130° C. or higher and is preferably 170° C. or lower, more preferably 160° C. or lower, and particularly preferably lower than 150° C. When the polyhydroxyalkanoate (B) has a plurality of melting points, it is preferable that at least one of the melting points falls within the above range.

The polyhydroxyalkanoate (B) is produced using microorganisms such as *Alcaligenes eutrophus* AC32 strain produced by introducing a PHA synthetic enzyme gene derived from *Aeromonas caviae* into *Alcaligenes eutrophus* (international deposit under the Budapest Treaty, international depositary authority: International Patent Organism Depositary, National Institute of Advanced Industrial Science and Technology (Central 6, 1-1-1 Higashi, Tsukuba, Ibaraki, Japan), date of original deposit: August 12 Heisei 8, transferred on August 7 Heisei 9, accession number: FERM BP-6038 (transferred from original deposit (FERM P-15786)) (J. Bacteriol., 179, 4821 (1997)).

The polyhydroxyalkanoate (B) used may be a commercial product. For example, "Aonilex (registered trademark) X131N," "Aonilex (registered trademark) X131A," "Aonilex (registered trademark) 151A," "Aonilex (registered trademark) 151C," "PHBH (registered trademark) X331N," "PHBH (registered trademark) X131A," "PHBH (registered trademark) 151A," and "PHBH (registered trademark) 151C" all manufactured by Kaneka Corporation may be used as the commercial product of the polyhydroxyalkanoate (B) including, as main constituent units, the 3-hydroxybutyrate unit and the 3-hydroxyhexanoate unit.

The number of polyhydroxyalkanoates (B) is not limited to one, and two or more polyhydroxyalkanoates (B) that differ in types of constituent units, the ratio of the constituent units, production method, physical properties, etc. may be mixed and used.

<Inorganic Filler (C)>

Examples of the inorganic filler (C) include anhydrous silica, isinglass, talc, mica, clay, titanium oxide, calcium carbonate, diatomaceous earth, allophane, bentonite, potassium titanate, zeolite, sepiolite, smectite, kaolin, kaolinite, glass, limestone, carbon, wollastonite, calcined pearlite, silicates such as calcium silicate and sodium silicate, aluminum oxide, magnesium carbonate, hydroxides such as calcium hydroxide, and salts such as ferric carbonate, zinc oxide, iron oxide, aluminum phosphate, and barium sulfate. Of these, talc, mica, clay, calcium carbonate, and zeolite are preferred.

Inorganic fillers such as calcium carbonate and limestone have the properties of a soil conditioner. An aliphatic polyester-based resin composition containing a particularly large amount of such an inorganic filler and further containing the polyester-based resin (A) derived from a biomass and the polyhydroxyalkanoate (B) undergoes biodegradation in soil.

After the biodegradation, the inorganic filler (C) remains present and functions as a soil conditioner, so that the advantage of the aliphatic polyester-based resin composition as green plastic can be increased.

Inorganic fillers (C) can be classified by their shape. The inorganic fillers (C) include fiber-like inorganic fillers, powder-like inorganic fillers, plate-shaped inorganic fillers, and needle-shaped inorganic fillers. Powder-like inorganic fillers and plate-shaped inorganic fillers are preferred, and plate-shaped inorganic fillers are particularly preferred. Examples of the plate-shaped fillers include talc, kaolin, mica, clay, sericite, glass flakes, synthesized hydrotalcite, various metal foils, graphite, molybdenum disulfide, tungsten disulfide, boron nitride, plate-shaped iron oxide, plate-shaped calcium carbonate, and plate-shaped aluminum hydroxide. From the viewpoint of increasing the ease of mixing, stiffness, injection moldability, decomposability, and deodorization effects and improving moisture permeability such as water vapor permeability, it is preferable to use talc, mica, clay calcium carbonate, or zeolite.

By reason of handleability, the average particle diameter of the inorganic filler (C) is preferably 0.5 μm or more, more preferably 0.6 μm or more, still more preferably 0.7 μm or more, and particularly preferably 1.0 μm or more. The average particle diameter of the inorganic filler (C) is preferably 50 μm or less, more preferably 30 μm or less, and still more preferably 20 μm or less.

No particular limitation is imposed on the method for measuring the average particle diameter of the inorganic filler (C). Specific examples of the measurement method include a method including determining the specific surface area per gram of the powder measured using a powder specific surface area measuring device SS-100 manufactured by SHIMADZU CORPORATION (a constant pressure air permeability method) and computing the average particle diameter of the filler using the following formula from the results of the measurement of the specific surface area based on the air permeability method according to JIS M-8511.

$$\text{Average particle diameter (μm)} = 10000 \times \{6/(\text{specific gravity of filler} \times \text{specific surface area})\}$$

One inorganic filler (C) may be used alone, or any combination of two or more at any ratio may be used.

Specific examples of the talc preferably usable as the inorganic filler (C) include MICRO ACE manufactured by NIPPON TALC CO., LTD. and MG113 and MG115 manufactured by FUJI TALC INDUSTRIAL CO., LTD.

<Mixing Ratios of Aliphatic Polyester-Based Resin (A), Polyhydroxyalkanoate (B), and Inorganic Filler (C)>

The mass ratio of the aliphatic polyester-based resin (A) to the polyhydroxyalkanoate (B) contained in the aliphatic polyester-based resin composition in the present invention is preferably the aliphatic polyester-based resin (A)/the polyhydroxyalkanoate (B)=75/25 to 10/90, more preferably 70/30 to 15/80, and still more preferably 65/45 to 20/80. If the amount of the aliphatic polyester-based resin (A) is larger than the above mass ratio range and the amount of the polyhydroxyalkanoate (B) is smaller than the above mass ratio range, the rate of biodegradation at room temperature is low. If the amount of the aliphatic polyester-based resin (A) is lower and the amount of the polyhydroxyalkanoate (B) is larger, it is difficult to perform molding.

The content of the inorganic filler (C) in the aliphatic polyester-based resin composition in the present invention relative to the total amount of the aliphatic polyester-based resin (A), the polyhydroxyalkanoate (B), and the inorganic filler (C) is preferably 15 to 50% by mass, more preferably 17 to 45% by mass, and still more preferably 20 to 35% by mass. If the content of the inorganic filler (C) is lower than the above lower limit, the water vapor barrier property and the oxygen barrier property obtained by mixing the inorganic filler (C) are not obtained, and the effect of improving the biodegradability and the moldability is not obtained. If the content of the inorganic filler (C) is larger than the above upper limit, mechanical strength such as impact resistance deteriorates.

<Additional Resins>

The aliphatic polyester-based resin composition in the present invention may contain one or two or more resins other than the aliphatic polyester-based resin (A) and the polyhydroxyalkanoate (B) such as: synthetic resins such as aromatic polyester-based resins, polycarbonates, polyamides, polystyrenes, polyolefins, acrylic resins, amorphous polyolefins, ABS, AS (acrylonitrilestyrene), polycaprolactones, polyvinyl alcohols, and cellulose esters; and biodegradable resins such as polylactic acid and polybutylene adipate terephthalate (PBAT) that is an aliphatic-aromatic polyester-based resin, so long as the effects of the present invention are not impaired.

When the aliphatic polyester-based resin composition in the present invention contains these additional resins, the content of the additional resins is preferably 50 parts by mass or less and particularly preferably 30 parts by mass or less based on 100 parts by mass of the total of the aliphatic polyester-based resin (A), the polyhydroxyalkanoate (B), and the additional resins, in order to effectively obtain the effects of the present invention that are obtained by containing the aliphatic polyester-based resin (A) and the polyhydroxyalkanoate (B) as resin components.

<Additional Components>

The aliphatic polyester-based resin composition in the present invention may contain, as "additional components," various additives such as a lubricant, a plasticizer, an antistatic agent, an antioxidant, a light stabilizer, an ultraviolet absorber, a dye, a pigment, an anti-hydrolysis agent, a nucleating agent, an antiblocking agent, a lightproof agent, a plasticizer, a thermal stabilizer, a flame retardant, a release agent, an antifogging agent, a surface wetting improver, an incineration aid, a dispersing aid, various surfactants, and a slipping agent, fine powders of animal/plant materials such as starch, cellulose, paper, wood flour, chitin, chitosan, coconut shell powder, and walnut shell powder, and mixtures thereof.

A functional additive such as a freshness preserving agent or an antimicrobial agent may be added to the aliphatic polyester-based resin composition in the present invention.

These may be optionally added so long as the effects of the present invention are not impaired. One of them may be used alone, or a mixture of two or more may be used.

Generally, the content of these additional components, i.e., the total amount of the components mixed, is preferably from 0.01% by mass to 40% by mass inclusive based on the total amount of the aliphatic polyester-based resin composition in the present invention, in order to prevent deterioration of the physical properties of the aliphatic polyester-based resin composition in the present invention.

Among the additional components, the antifogging agent may be pre-kneaded into the aliphatic polyester-based resin composition or may be applied to the surface of a molded article after molding. Specifically, the antifogging agent used is preferably an ester-based surfactant prepared using a saturated or unsaturated aliphatic carboxylic acid having 4 to 20 carbon atoms and a polyhydric alcohol.

Examples of the slipping agent include unsaturated and saturated aliphatic acid amides prepared from unsaturated and saturated aliphatic acids having 6 to 30 carbon atoms and unsaturated and saturated aliphatic acid bisamides. Most preferred examples of the slipping agent include erucic acid amide, oleic acid amide, stearic acid amide, and bisamides thereof. These may be optionally added so long as the effects of the present invention are not impaired. One of them may be used alone, or a mixture of two or more may be used.

Examples of the antiblocking agent include saturated aliphatic acid amides having 6 to 30 carbon atoms, saturated aliphatic acid bisamides, methylol amide, ethanol amide, natural silica, synthetic silica, synthetic zeolite, and talc.

Specific examples of the lightproof agent include bis(2,2,6,6-tetramethyl-4-piperidyl)sebacate, bis(1,2,2,6,6-pentamethyl-4-piperidyl)sebacate, bis(l-octyloxy-2,2,6,6-tetramethyl-4-piperidyl)sebacate, 2-(3,5-di-t-butyl-4-hydroxyphenyl)-2-n-butyl-bis(2,2,6,6-tetramethyl-4-piperidyl)malonate, 2-(3,5-di-t-butyl-4-hydroxyphenyl)-2-n-butyl-bis(1,2,2,6,6-pentamethyl-4-piperidyl)malonate, 2-(3,5-di-t-butyl-4-hydroxybenzyl)-2-n-butyl-bis(2,2,6,6-tetramethyl-4-piperidyl)malonate, 2-(3,5-di-t-butyl-4-hydroxybenzyl)-2-n-butyl-bis(1,2,2,6,6-pentamethyl-4-piperidyl)malonate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, mixed (2,2,6,6-tetramethyl-4-piperidyl/tridecyl)-1,2,3,4-butanetetracarboxylate, mixed (1,2,2,6,6-pentamethyl-4-piperidyl/tridecyl)-1,2,3,4-butanetetracarboxylate, mixed {2,2,6,6-tetramethyl-4-piperidyl/β,β,β',β'-tetramethyl-3,9-[2,4,8,10-tetraoxaspiro[5.5]undecane]diethyl}-1,2,3,4-butanetetracarboxylate, mixed {1,2,2,6,6-pentamethyl-4-piperidyl/β,β,β',β'-tetramethyl-3,9-[2,4,8,10-tetraoxaspiro[5.5]undecane]diethyl}-1,2,3,4-butanetetracarboxylate, 1,2-bis(3-oxo-2,2,6,6-tetramethyl-4-piperidyl)ethane, 1-(3,5-di-t-butyl-4-hydroxyphenyl)-1,1-bis(2,2,6,6-tetramethyl-4-piperidyloxycarbonyl)pentane, poly[1-oxyethylene(2,2,6,6-tetramethyl-1,4-piperidyl)oxysuccinyl], poly[2-(1,1,4-trimethylbutylimino)-4,6-triazinediyl-(2,2,6,6-tetramethyl-4-piperidyl)iminohexamethylene-(2,2,6,6-tetramethyl-4-piperidyl)imino], N,N'-bis(3-aminopropyl)ethylenediamine-2,4-bis[N-butyl-N-(2,2,6,6-tetramethyl-4-piperidyl)amino]-6-chloro-1,3,5-triazine condensate, an N-methyl compound thereof, and a polycondensate of succinic acid and 1-(2-hydroxyethyl)-4-hydroxy-2,2,6,6-tetramethylpiperidine.

Of these, bis(1,2,2,6,6-pentamethyl-4-piperidyl)sebacate and 2-(3,5-di-t-butyl-4-hydroxybenzyl)-2-n-butyl-bis(1,2,2,6,6-pentamethyl-4-piperidyl)malonate are particularly preferred.

Examples of the ultraviolet absorber include benzophenone-based, benzotriazole-based, salicylic acid-based, and cyanoacrylate-based ultraviolet absorbers. Among these ultraviolet absorbers, benzotriazole-based ultraviolet absorbers are preferred, and specific examples include 2-[2-hydroxy-3,5-bis(α,α-dimethylbenzyl)phenyl]-2H-benzotriazole and 2-(4,6-diphenyl-1,3,5-triazin-2-yl)-5-hexyloxyphenol.

Examples of the antioxidant include: hindered phenol-based antioxidants such as BHT (dibutylhydroxytoluene), 2,2'-methylenebis(4-methyl-6-tert-butylphenol), pentaerythritol tetrakis[3-(3,5-di-tert-butyl-4-hydroxyphenyl)propionate], 3,3',3",5,5',5"-hexa-tert-butyl-α,α',α"-(mesitylene-2,4,6-triyl)tri-p-cresol, octadecyl-3-(3,5-di-tert-butyl-4-hydroxyphenyl)propionate, 1,3,5-tris[(4-tert-butyl-3-hydroxy-2,6-xylyl)methyl]-1,3,5-triazine-2,4,6(1H,3H,5H)-trione, 1,3,5-tris(3,5-di-tert-butyl-4-hydroxybenzyl)-1,3,5-triazine-2,4,6(1H,3H,5H)-trione, calcium diethyl bis[{3,5-bis(1,1-dimethylethyl)-4-hydroxyphenyl}methyl]phosphonate, bis(2,2'-dihydroxy-3,3'-di-tert-butyl-5,5'-dimethylphenyl)ethane, and N,N'-hexane-1,6-diylbis[3-(3,5-di-tert-butyl)-4-hydroxyphenyl]propionamide; phosphorous-based antioxidants such as tridecyl phosphite, diphenyldecyl phosphite, tetrakis(2,4-di-tert-butylphenyl)[1,1-biphenyl]-4,4'-diyl-bisphosphonate, phosphorous acid bis[2,4-bis(1,1-dimethylethyl)-6-methylphenyl]ethyl ester, and bis(2,4-di-tert-butylphenyl)pentaerythritol diphosphite; lactone-based antioxidants such as a reaction product of 3-hydroxy-5,7-di-tert-butyl-furan-2-one and xylene; sulfur-based antioxidants such as dilauryl thiodipropionate and distearyl thiodipropionate; and mixtures of two or more of these compounds. Of these, hindered phenol-based antioxidants are preferably used.

Preferred examples of the hindered phenol-based antioxidants include: Irganox 3790, Irganox 1330, Irganox 1010, Irganox 1076, Irganox 3114, Irganox 1425WL, Irganox 1098, Irganox HP2225FL, Irganox HP2341, and Irgafos XP-30 (manufactured by BASF); and SUMILIZER BBM-S (manufactured by Sumitomo Chemical Co., Ltd.). The most preferable antioxidants are Irganox 1010 (pentaerythritol tetrakis[3-(3,5-di-tert-butyl-4-hydroxyphenyl)propionate]) and Irganox 1330 (3,3',3",5,5',5"-hexa-tert-butyl-α,α',α"-(mesitylene-2,4,6-triyl)tri-p-cresol).

<Method for Producing Aliphatic Polyester-Based Resin Composition>

The aliphatic polyester-based resin composition in the present invention is produced by mixing the aliphatic polyester-based resin (A), the polyhydroxyalkanoate (B), the inorganic filler (C), optional additional resins, and optional additional components.

The mixing step is performed by mixing, preferably melt-kneading, the aliphatic polyester-based resin (A), the polyhydroxyalkanoate (B), the inorganic filler (C), the optional additional resins, and the optional additional components at a prescribed ratio simultaneously or in any order using a mixer such as a tumbler, a V blender, a Nauta mixer, a Banbury mixer, kneading rolls, or an extruder.

The kneader used in the mixing step may be a melt kneader. No limitation is imposed on the type of extruder, i.e., any of a twin screw extruder and a single screw extruder may be used. However, a twin screw extruder is more preferred for the purpose of performing melt kneading according to the characteristics of the aliphatic polyester-based resin (A) used, the polyhydroxyalkanoate (B) used, and the inorganic filler (C) used.

The temperature during melt kneading is preferably 120 to 220° C. In this temperature range, the time required for the melt reaction can be reduced, and deterioration in color due to degradation of the resin, thermal decomposition, etc. can be prevented. Moreover, practical physical properties such as impact resistance and resistance to moist heat can be further improved. From the same point of view, the temperature during melt kneading is more preferably 130 to 160° C.

From the viewpoint of avoiding degradation of the resin reliably, an unnecessarily long melt kneading time is not preferred. The melt kneading time is preferably from 20 seconds to 20 minutes inclusive and more preferably from 30 seconds to 15 minutes inclusive. It is preferable to set the conditions such as the melt kneading temperature and time such the above melt kneading time is satisfied.

[Bonding Layer]

A description will be given of an adhesive resin composition in the present invention that contains a modified polyester-based resin (D) and is used preferably for the bonding layer interposed between the aliphatic polyester-based resin layer and the PVA-based resin layer in the biodegradable laminate of the present invention.

The adhesive resin composition in the present invention contains the modified polyester-based resin (D) obtained by subjecting a polyester-based resin (d) (hereinafter may be referred to as a "polyester-based resin (d) in the present invention") mainly containing the aliphatic polyester-based resin (A) and/or an aliphatic-aromatic polyester-based resin described later to graft modification with an α, β-unsaturated carboxylic acid and/or an anhydride thereof.

No particular limitation is imposed on the polyester-based resin (d) so long as it contains the aliphatic polyester-based resin (A) and/or the aliphatic-aromatic polyester-based resin. The phrase "mainly contained" in the polyester-based resin (d) generally means a component contained in the polyester-based resin (d) in an amount of 80% by mass or more. The polyester-based resin (d) may contain an additional resin so long as the polyester-based resin (d) mainly contains the aliphatic polyester-based resin (A) and/or the aliphatic-aromatic polyester-based resin and so long as the effects of the present invention are not impaired. Examples of the additional resin optionally contained in the polyester-based resin (d) include: the polyhydroxyalkanoates (B); synthetic resins such as aromatic polyester-based resins, polycarbonates, polyamides, polystyrenes, polyolefins, acrylic resins, amorphous polyolefins, ABS, AS (acrylonitrilestyrene), polycaprolactones, polyvinyl alcohols, and cellulose esters; and polylactic acid.

From the viewpoint of processability, moldability, and adhesiveness when the polyester-based resin (d) is used for the bonding layer having high biodegradability and used for the biodegradable laminate, it is preferable that the polyester-based resin (d) is composed only of the aliphatic polyester-based resin (A) and/or the aliphatic-aromatic polyester-based resin.

From the viewpoint of improving mechanical strength and adhesiveness when the biodegradable resin laminate is produced, it is preferable that the polyester-based resin (d) in the present invention contains the aliphatic polyester-based resin (A) and the aliphatic-aromatic polyester-based resin or contains the aliphatic-aromatic polyester-based resin, and it is more preferable that the polyester-based resin (d) contains the aliphatic polyester-based resin (A) and the aliphatic-aromatic polyester-based resin. When the aliphatic-aromatic polyester-based resin is contained, primary processability is improved.

When the polyester-based resin (d) contains the aliphatic polyester-based resin (A) and the aliphatic-aromatic polyester-based resin, the presence ratios of the aliphatic polyester resin (A) and the aliphatic-aromatic polyester-based resin are as follows. From the viewpoint of biodegradability and processability, the aliphatic polyester-based resin (A) is contained in an amount of preferably 15 to 50% by mass based on 100% by mass of the total mass of the aliphatic polyester resin (A) and the aliphatic-aromatic polyester-based resin, and the aliphatic-aromatic polyester-based resin is contained in an amount of 50 to 85% by mass.

In the adhesive resin composition in the present invention, the aliphatic polyester-based resin (A) contained in the polyester-based resin (d) is the same as the above-described aliphatic polyester-based resin (A).

The aliphatic-aromatic polyester-based resin contained in the polyester-based resin (d) is a polyester-based resin in which at least part of the repeating units in the aliphatic polyester-based resin (A) are replaced by an aromatic compound unit and is preferably, for example, a polyester-based resin in which part of the aliphatic dicarboxylic acid unit in the aliphatic polyester-based resin (A) is replaced by an aromatic dicarboxylic acid unit and which includes the aliphatic diol unit, the aliphatic dicarboxylic acid unit, and the aromatic dicarboxylic acid unit as main constituent units.

Examples of the aromatic compound unit include aromatic diol units having an aromatic hydrocarbon group optionally having a substituent, aromatic dicarboxylic acid units having an aromatic hydrocarbon group optionally having a substituent, and aromatic oxycarboxylic acid units having an aromatic hydrocarbon group optionally having a substituent. The aromatic hydrocarbon group may be a monocyclic group or may include a plurality of rings mutually connected or fused. Specific examples of the aromatic hydrocarbon group include a 1,2-phenylene group, a 1,3-phenylene group, a 1,4-phenylene group, a dinaphthylene group, and a diphenylene group.

Specific examples of the aromatic dicarboxylic acid component that provides the aromatic dicarboxylic acid unit include terephthalic acid, isophthalic acid, naphthalenedicarboxylic acid, and diphenyldicarboxylic acid. Of these, terephthalic acid is preferred.

The aromatic dicarboxylic acid component may be a derivative of an aromatic dicarboxylic acid compound. For example, a derivative of any of the above-exemplified aromatic dicarboxylic acid components is preferred, and examples thereof include lower alkyl esters having 1 to 4 carbon atoms and acid anhydrides. Specific examples of the derivative of the aromatic dicarboxylic acid compound include: lower alkyl esters such as methyl esters, ethyl esters, propyl esters, and butyl esters of the above-exemplified aromatic dicarboxylic acid components; and cyclic acid anhydrides of the above-exemplified aromatic dicarboxylic acid components such as succinic anhydride. Of these, dimethyl terephthalate is preferred.

Specific examples of the aromatic diol component that provides the aromatic diol unit include xylylene glycol, 4,4'-dihydroxybiphenyl, 2,2-bis(4'-hydroxyphenyl)propane, 2,2-bis(4'-β-hydroxyethoxyphenyl)propane, bis(4-hydroxyphenyl)sulfone, and bis(4-β-hydroxyethoxyphenyl)sulfonic acid. The aromatic diol component may be a derivative of an aromatic diol compound. A compound having a structure in which a plurality of aliphatic diol compounds and/or aromatic diol compounds are dehydration-condensed may be used.

Specific examples of the aromatic oxycarboxylic acid component that provides the aromatic oxycarboxylic acid unit include p-hydroxybenzoic acid and p-β-hydroxyethoxybenzoic acid. The aromatic oxycarboxylic acid component may be a derivative of an aromatic oxycarboxylic acid compound. A compound (oligomer) having a structure in which a plurality of aliphatic oxycarboxylic acid compounds and/or aromatic oxycarboxylic acid compounds are dehydration-condensed may be used. Specifically, an oligomer may be used as a raw material.

When the aromatic compound component that provides the aromatic compound unit has optical isomers, any of a D-form, an L-form, and a racemate may be used. The aromatic compound component is not limited to the above examples so long as the aromatic compound component can provide the aromatic compound unit. One aromatic compound component may be used alone, or any combination of two or more at any ratio may be used.

In the aliphatic-aromatic polyester-based resin, it is preferable to use the aromatic dicarboxylic acid component as the component that provides the aromatic compound unit. In this case, the content of the aromatic dicarboxylic acid unit is preferably from 10% by mole to 80% by mole inclusive based on the total amount (100% by mole) of the aliphatic dicarboxylic acid unit and the aromatic dicarboxylic acid unit. The aromatic dicarboxylic acid component used is preferably terephthalic acid, and the aliphatic-aromatic polyester-based resin is preferably polybutylene terephthalate adipate and/or a polybutylene terephthalate succinate-based resin.

The aliphatic-aromatic polyester-based resin can be produced in the same manner as that for the above-described aliphatic polyester-based resin (A) using at least the aromatic compound component as a raw material.

The molecular weight of the aliphatic-aromatic polyester-based resin used in the present invention can be measured by gel permeation chromatography (GPC), and the weight average molecular weight (Mw) measured using monodispersed polystyrenes as standard materials is generally from 10,000 to 1,000,000 inclusive. The weight average molecular weight (Mw) of the aliphatic-aromatic polyester-based resin is preferably from 30,000 to 800,000 inclusive and more preferably from 50,000 to 600,000 inclusive because such a weight average molecular weight is advantageous in terms of moldability and mechanical strength.

The melt flow rate (MFR) of the aliphatic-aromatic polyester-based resin is a value measured at 190° C. and a load of 2.16 kg according to JIS K7210 (1999) and is generally from 0.1 g/10 minutes to 100 g/10 minutes inclusive. From the viewpoint of moldability and mechanical strength, the MFR of the aliphatic-aromatic polyester-based resin is preferably 50 g/10 minutes or less and particularly preferably 30 g/10 minutes or less. The MFR of the aliphatic-aromatic polyester-based resin can be controlled by changing its molecular weight.

The melting point of the aliphatic-aromatic polyester-based resin is generally 60° C. or higher, preferably 70° C. or higher, and more preferably 80° C. or higher and is preferably 150° C. or lower, more preferably 140° C. or lower, and particularly preferably 120° C. or lower. When the aliphatic-aromatic polyester-based resin has a plurality of melting points, it is preferable that at least one of the melting points falls within the above range.

The elastic modulus of the aliphatic-aromatic polyester-based resin is preferably 180 to 1000 MPa.

If the melting point is outside the above range, the moldability is poor. If the elastic modulus is less than 180 MPa, problems tend to occur in moldability and processability. If the elastic modulus exceeds 1000 MPa, shock resistance tends to deteriorate.

No particular limitation is imposed on the methods for adjusting the melting point and elastic modulus of the aliphatic-aromatic polyester-based resin. The melting point and the elastic modulus can be adjusted, for example, by selecting the type of copolymerizing component of the aliphatic dicarboxylic acid component other than the aromatic dicarboxylic acid component, adjusting the copolymerizing ratio, or combining them.

In the present invention, the number of aliphatic-aromatic polyester-based resins used is not limited to one, and two or more aliphatic-aromatic polyester-based resins that differ in types of constituent units, the ratio of the constituent units, production method, physical properties, etc. may be mixed and used.

<Modified Polyester-Based Resin (D)>

The modified polyester-based resin (D) contains a compound obtained by graft-modifying the above polyester resin (d) with an α, β-unsaturated carboxylic acid and/or an anhydride thereof.

The polyester-based resin (d) contains the aliphatic polyester-based resin and/or the aliphatic-aromatic polyester-based resin and is therefore biodegradable. The basic skeleton of the modified polyester-based resin (D) obtained by graft-modifying the polyester-based resin (d) with an α, β-unsaturated carboxylic acid and/or an anhydride thereof is aliphatic polyester or aliphatic-aromatic polyester, and the skeleton of the modified polyester-based resin (D) is obtained by modifying the aliphatic polyester or aliphatic-aromatic polyester skeleton slightly, so that the modified polyester-based resin (D) is biodegradable.

The weight average molecular weight of the polyester-based resin (d) is a polystyrene-equivalent value measured by GPC and is generally 5000 to 1,000,000, preferably 20,000 to 500,000, and particularly preferably 50,000 to 400,000. If the weight average molecular weight of the polyester-based resin (d) is excessively large, the melt viscosity tends to be high, and it tends to be difficult to perform melt molding. If the weight average molecular weight is excessively small, a molded article tends to be brittle.

Examples of a commercial product of the polyester-based resin (d) include "Ecoflex" manufactured by BASF and containing as a main component a polycondensation product of adipic acid/terephthalic acid and 1,4-butanediol and "BioPBS" manufactured by PTTMCC Biochem and containing as a main component a polycondensation product of succinic acid/adipic acid/1,4-butanediol. Examples of the polyhydroxyalkanoate (B) contained in the polyester-based resin (d) as an optional component include "Aonilex" manufactured by Kaneka Corporation.

Specific examples of the α, β-unsaturated carboxylic acid and/or the anhydride thereof used for the graft modification of the polyester-based resin (d) include: α,β-unsaturated monocarboxylic acids such as acrylic acid and methacrylic acid; α,β-unsaturated dicarboxylic acids such as maleic acid, fumaric acid, itaconic acid, citrus acid, tetrahydrophthalic acid, crotonic acid, and isocrotonic acid; and derivatives and anhydrides thereof. Anhydrides of α,β-unsaturated dicarboxylic acids are used preferably.

One of these α, β-unsaturated carboxylic acids and/or anhydrides thereof may be used alone, but this is not a limitation. A combination of two or more may be used.

No particular limitation is imposed on the method for graft modifying the polyester-based resin (d) with the α, β-unsaturated carboxylic acid and/or a derivative thereof, and a well-known method can be used. The graft modification can be performed only through a thermal reaction. However, to increase the reactivity, it is preferable to use a radical initiator. Examples of the reaction method include a solution reaction, a reaction using a suspension, and a reaction in a molten state using no solvent. In particular, it is preferable to perform the reaction in a molten state.

Two or more polyester-based resins (d) may be used. In this case, the polyester-based resins (d) are mixed in advance and then graft-modified with the α, β-unsaturated carboxylic acid and/or a derivative thereof to thereby obtain the modified polyester-based resin (D). Alternatively, two or more modified polyester-based resins (D) may be mixed.

Specifically, the adhesive resin composition in the present invention uses the polyester-based resin (d) mainly containing the aliphatic polyester-based resin (A) and/or the aliphatic-aromatic polyester-based resin. When the polyester-based resin (d) contains the aliphatic polyester-based resin (A) and the aliphatic-aromatic polyester-based resin, the aliphatic polyester-based resin (A) graft-modified with the α, β-unsaturated carboxylic acid and/or a derivative thereof and the aliphatic-aromatic polyester-based resin graft-modified with the α, β-unsaturated carboxylic acid and/or a derivative thereof are prepared in advance and then mixed to produce the modified polyester-based resin (D). Alternatively, a mixture of the aliphatic polyester-based resin (A) graft-modified with the α, β-unsaturated carboxylic acid and/or a derivative thereof and the aliphatic-aromatic polyester-based resin or a mixture of the aliphatic polyester-based resin (A) and the aliphatic-aromatic polyester-based resin graft-modified with the α, β-unsaturated carboxylic acid and/or a derivative thereof may be used as the modified polyester-based resin (D). Alternatively, a mixture of the aliphatic polyester-based resin (A) and the aliphatic-aromatic polyester-based resin may be graft-modified with the α, β-unsaturated carboxylic acid and/or a derivative thereof to obtain the modified polyester-based resin (D). Resins modified using different methods as described above may be mixed to obtain the modified polyester-based resin (D).

In the adhesive resin composition in the present invention, from the viewpoint of improving biodegradability, improving adhesiveness, and improving the appearance of the bonding layer to be formed, it is preferable to obtain the modified polyester-based resin (D) using a mixture of the aliphatic-aromatic polyester-based resin graft-modified with the α, β-unsaturated carboxylic acid and/or a derivative thereof and the aliphatic polyester-based resin (A) or using a product obtained by graft-modifying a mixture of the aliphatic polyester-based resin (A) and the aliphatic-aromatic polyester-based resin with the α, β-unsaturated carboxylic acid and/or a derivative thereof. From the viewpoint of a biodegradable resin composition necessary for home composting, it is more preferable to obtain the modified polyester-based resin (D) using a mixture of the aliphatic-aromatic polyester-based resin graft-modified with the α, β-unsaturated carboxylic acid and/or a derivative thereof and the aliphatic polyester-based resin (A). In this case, the ratio (% by mass) of the aliphatic-aromatic polyester-based resin graft-modified with the α, β-unsaturated carboxylic acid and/or a derivative thereof and contained in the modified polyester-based resin (D) is preferably 50 to 90% by mass based on 100% by mass of the total of the aliphatic polyester-based resin (A) and the aliphatic-aromatic polyester-based resin graft-modified with the α, β-unsaturated carboxylic acid and/or a derivative thereof. The ratio of the aliphatic polyester-based resin (A) is preferably 10 to 50% by mass based on 100% by mass of the total of the aliphatic polyester-based resin (A) and the aliphatic-aromatic polyester-based resin graft-modified with the α, β-unsaturated carboxylic acid and/or a derivative thereof.

In the modified polyester-based resin (D), one or two or more polyester-based resins (d) may be mixed so long as the performance of the modified polyester-based resin (D) is not impeded.

A method in which the polyester-based resin (d), the α, β-unsaturated carboxylic acid and/or a derivative thereof, and the radical initiator are mixed in advance and melt-kneaded in a kneader to allow the reaction to proceed may be used as a melting method. Alternatively, a method in which the α, β-unsaturated carboxylic acid and/or a derivative thereof and the radical initiator are added to the polyester-based resin (d) in a molten state in a kneader may be used as the melting method.

The mixer used to mix the raw materials in advance may be a Henschel mixer, a ribbon blender, etc., and the kneader used for the melt kneading may be a single screw or twin screw extruder, rolls, a Banbury mixer, a kneader, a Brabender mixer, etc.

The temperature during melt kneading may be appropriately set to be higher than the melting point of the polyester-based resin (d) so as to fall within a temperature range in which the polyester-based resin (d) does not thermally deteriorate. The melt mixing temperature is preferably 100 to 270° C. and more preferably 160 to 250° C.

The amount used of the α, β-unsaturated carboxylic acid and/or a derivative thereof is generally in the range of 0.0001 to 5 parts by mass, preferably in the range of 0.001 to 4 parts by mass, and particularly preferably in the range of 0.02 to 3 parts by mass based on 100 parts by mass of the polyester-based resin (d). If the amount used of the α, β-unsaturated carboxylic acid and/or a derivative thereof is excessively small, a sufficient amount of polar groups are not introduced into the polyester-based resin (d), and interlayer adhesiveness, particularly the adhesion with a PVA-based resin layer, tends to be insufficient. If the amount used of the α, β-unsaturated carboxylic acid and/or a derivative thereof is excessively large, the α, β-unsaturated carboxylic acid and/or the derivative thereof used for the graft polymerization may remain present in the resin, and a poor appearance caused by the remaining carboxylic acid tends to occur.

No particular limitation is imposed on the radical initiator, and a well-known radical initiator may be used. Examples of the radical initiator include: organic and inorganic peroxides such as t-butyl hydroperoxide, cumene hydroperoxide, 2,5-dimethylhexane-2,5-dihydroperoxide, 2,5-dimethyl-2,5-bis(t-butyloxy)hexane, 3,5,5-trimethylhexanoyl peroxide, t-butyl peroxybenzoate, benzoyl peroxide, m-toluoyl peroxide, dicumyl peroxide, 1,3-bis(t-butylperoxyisopropyl)benzene, dibutyl peroxide, methyl ethyl ketone peroxide, potassium peroxide, and hydrogen peroxide; azo compounds such as 2,2'-azobisisobutyronitrile, 2,2'-azobis(isobutylamide)dihalide, 2,2'-azobis[2-methyl-N-(2-hydroxyethyl)propionamide], and azodi-t-butane; and carbon radical generators such as dicumyl.

One of these may be used alone, or a combination of two or more may be used.

The amount of the radical initiator mixed is generally in the range of 0.00001 to 2.0 parts by mass, preferably in the range of 0.0001 to 1.5 parts by mass, particularly preferably in the range of 0.001 to 1.0 parts by mass based on 100 parts by mass of the polyester-based resin (d). If the amount of the radical initiator mixed is excessively small, sufficient graft polymerization does not occur, and sufficient interlayer adhesiveness may not be obtained. If the amount of the radical initiator mixed is excessively large, a crosslinking reaction of the polyester-based resin (d) proceeds, and the amount of extrusion during thermal melt molding is not stabilized, so that the appearance of a multilayer molded article tends to deteriorate.

No limitation is imposed on the content of the unsaturated carboxylic acid and/or a derivative thereof in the modified polyester-based resin (D). The content is generally 0.01% by mass or more, preferably 0.02% by mass or more, and more preferably 0.03% by mass or more and is generally 5.0% by mass or less, preferably 4.0% by mass or less, and more preferably 3.0% by mass or less.

If the content of the unsaturated carboxylic acid and/or the derivative thereof in the modified polyester-based resin (D) is excessively small, interlayer adhesiveness, particularly the adhesion with the PVA-based resin layer, tends to be insufficient. If the content of the unsaturated carboxylic acid and/or the derivative thereof in the modified polyester-based resin (D) is excessively large, the stability during thermal melt molding tends to decrease.

The content of the unsaturated carboxylic acid and/or the derivative thereof in the modified polyester-based resin (D) can be determined from a spectrum obtained in $^1$H-NMR measurement.

The bonding layer of the biodegradable laminate of the present invention may contain only one modified polyester-based resin (D) or may contain two or more modified polyester-based resins (D).

[PVA-Based Resin Layer]

The PVA-based resin layer in the biodegradable laminate of the present invention will be described.

The PVA-based resin layer is responsible particularly for gas barrier properties of the laminate and is laminated onto at least one surface of the aliphatic polyester-based resin layer with the bonding layer therebetween.

The PVA-based resin layer in the present invention is a layer containing a PVA-based resin as a main component and contains the PVA-based resin in an amount of generally 70% by mass or more, particularly 80% by mass or more, and more particularly 90% by mass or more. If the content of the PVA-based resin in the PVA-based resin layer is excessively small, the gas barrier properties tend to be insufficient.

The PVA-based resin used in the PVA-based resin layer is a resin that is obtained by saponifying a polyvinyl ester-based resin obtained by copolymerizing a vinyl ester-based monomer, composed mainly of a vinyl alcohol structural unit, and includes the vinyl alcohol structural unit in an amount corresponding to the degree of saponification and a vinyl ester structural unit.

Examples of the vinyl ester-based monomer include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, and vinyl versatate. Economically, vinyl acetate is used preferably.

The average degree of polymerization (measured according to JIS K6726) of the PVA-based resin used in the present invention is generally 200 to 1800, preferably 300 to 1500, and particularly preferably 300 to 1000.

If the average degree of polymerization of the PVA-based resin is excessively small, the mechanical strength of the PVA-based resin layer tends to be insufficient. If the average degree of polymerization of the PVA-based resin is excessively large, flowability when the PVA-based resin layer is formed by thermal melt molding may be insufficient, and the moldability tends to decrease. Moreover, abnormal shear heating occurs during molding, and the resin may be likely to thermally decompose.

The degree of saponification (measured according to JIS K6726) of the PVA-based resin used in the present invention is generally 80 to 100% by mole, preferably 90 to 99.9% by mole, and particularly preferably 98 to 99.9% by mole. If the degree of saponification of the PVA-based resin is excessively low, the gas barrier properties tends to deteriorate.

The PVA-based resin used may be a resin obtained by copolymerizing monomers to produce the polyvinyl ester-based resin and then saponifying the copolymer or may be a modified PVA-based resin obtained by introducing various functional groups into an unmodified PVA by post-modification.

Examples of the monomer used for the copolymerization with the vinyl ester-based monomer include: olefins such as ethylene, propylene, isobutylene, a-octene, a-dodecene, and a-octadecene; hydroxy group-containing α-olefins such as 3-buten-1-ol, 4-penten-1-ol, 5-hexen-1-ol, and 3,4-dihydroxy-1-butene and derivatives thereof such as acylated products thereof; unsaturated acids such as acrylic acid, methacrylic acid, crotonic acid, maleic acid, maleic anhydride, and itaconic acid, salts thereof, monoesters thereof, and dialkyl esters thereof; nitriles such as acrylonitrile and methacrylonitrile; amides such as diacetone acrylamide, acrylamide, and methacrylamide; olefin sulfonic acids such as ethylenesulfonic acid, allylsulfonic acid, and methallylsulfonic acid and salts thereof; alkyl vinyl ethers; vinyl compounds such as dimethylallyl vinyl ketone, N-vinylpyrrolidone, vinyl chloride, vinyl ethylene carbonate, 2,2-dialkyl-4-vinyl-1,3-dioxolane, glycerin monoallyl ether, and 3,4-diacetoxy-1-butene; substituted vinyl acetates such as isopropenyl acetate and 1-methoxyvinyl acetate; vinylidene chloride; 1,4-diacetoxy-2-butene; and vinylene carbonate.

Examples of the PVA-based resin with functional groups introduced thereto by post-reaction include a PVA-based resin having an acetoacetyl group generated by the reaction with diketene, a PVA-based resin having a polyalkyleneoxide group generated by the reaction with ethylene oxide, a PVA-based resin having a hydroxyalkyl group generated by the reaction with an epoxy compound, and a PVA-based resin obtained by reacting an aldehyde compound having various functional groups with PVA.

The content of the modified species in the modified PVA resin, i.e., the constituent units derived from monomers in the copolymer or the functional groups introduced by the post-reaction, is generally in the range of 1 to 20% by mole inclusive and particularly preferably in the range of 2 to 10% by mole inclusive. However, the range cannot be specified definitely because the characteristics vary largely depending on the modified species.

Among the various modified PVA-based resins, a PVA-based resin having a structural unit represented by the following general formula (14) in which a 1,2-diol structure is bonded to a side chain is preferably used in the present invention because melt molding is facilitated in a method for producing the biodegradable laminate of the present invention described later.

$R^1$, $R^2$, and $R^3$ in general formula (14) each independently represent a hydrogen atom or an organic group, and X represents a single bond or a bonding chain. $R^4$, $R^5$, and $R^6$ each independently represent a hydrogen atom or an organic group.

[Chem. 1]

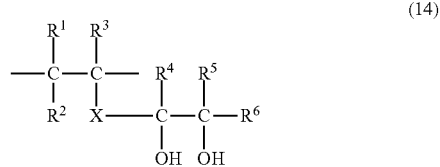

(14)

In particular, a PVA-based resin having a structural unit represented by general formula (14a) in which $R^1$ to $R^3$ and $R^4$ to $R^6$ in the 1,2-diol structural unit represented by general formula (14) are each a hydrogen atom and X is a single bond is most preferable.

[Chem. 2]

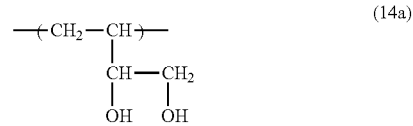

(14a)

$R^1$ to $R^3$ and $R^4$ to $R^6$ in the structural unit represented by general formula (14) may each be an organic group so long as the organic group is present in an amount that does not impair the characteristics of the resin significantly. Examples of the organic group include alkyl groups having 1 to 4 carbon atoms such as a methyl group, an ethyl group, a n-propyl group, an isopropyl group, a n-butyl group, an isobutyl group, and a tert-butyl group. These organic groups may each optionally have a functional group such as a halogen group, a hydroxy group, an ester group, a carboxylic acid group, or a sulfonic acid group.

X in the 1,2-diol structural unit represented by general formula (14) is most preferably a single bond in terms of thermal stability and stability at high temperature and under acidic conditions but may be a bonding chain so long as the effects of the present invention are not impaired. Examples of the bonding chain include hydrocarbons such as alkylenes, alkenylenes, alkynylenes, phenylenes, and naphthylenes (these hydrocarbons may be optionally substituted with, for example, halogens such as fluorine, chlorine, and bromine) and further include —O—, —(CH$_2$O)$_r$—, —(OCH$_2$)$_r$—, —(CH$_2$O)$_r$CH$_2$—, —CO—, —COCO—, —CO(CH$_2$)$_r$CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, and —OAl(OR)O— (Rs are each independently a substituent and are each preferably a hydrogen atom or an alkyl group, and r is an integer of 1 to 5). In particular, in terms of stability during production or use, the bonding chain is preferably an alkylene group having 6 or less carbon atoms and particularly preferably a methylene group or —CH$_2$OCH$_2$—.

No particular limitation is imposed on the method for producing the PVA-based resin having the 1,2-diol structure in its side chains. Preferred examples of the method include (i) a method in which a copolymer of the vinyl ester-based monomer and a compound represented by general formula (15) below is saponified, (ii) a method in which a copolymer of the vinyl ester-based monomer and a compound represented by general formula (16) below is saponified and decarboxylated, and (iii) a method in which a copolymer of the vinyl ester-based monomer and a compound represented by general formula (17) below is saponified and subjected to deketalization.

[Chem. 3]

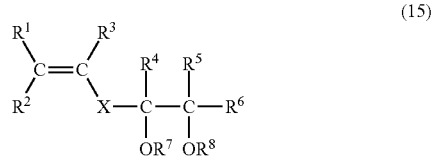

(15)

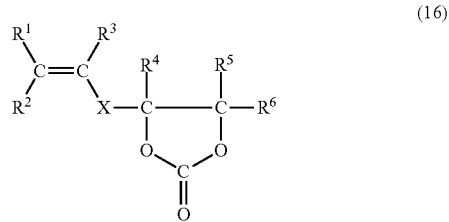

(16)

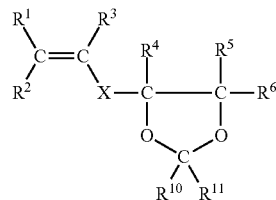

(17)

In general formula (15), (16), and (17), $R^1$, $R^2$, $R^3$, X, $R^4$, $R^5$, and $R^6$ are the same as those in general formula (14). $R^7$ and $R^8$ are each independently a hydrogen atom or $R^9$—CO- (where $R^9$ is an alkyl group). $R^{10}$ and $R^{11}$ are each independently a hydrogen atom or an alkyl group.

For example, a method described in Japanese Unexamined Patent Application Publication No. 2006-95825 may be used for methods (i), (ii), and (iii).

In particular, in method (i), the compound represented by general formula (16) is preferably 3,4-diacyloxy-1-butene and particularly preferably 3,4-diacetoxy-1-butene because of their high copolymerization reactivity and good industrial handleability.

The content of the 1,2-diol structural unit contained in the PVA-based resin having the 1,2-diol structure in its side chains is generally 1 to 20% by mole, preferably 2 to 10% by mole, and particularly preferably 3 to 8% by mole. If the content of the 1,2-diol structural unit is excessively low, the effect of the 1,2-diol side chain structure is unlikely to be obtained. If the content is excessively high, the gas barrier properties are reduced significantly at high humidity.

The content of the 1,2-diol structural unit in the PVA-based resin can be determined from a $^1$H-NMR spectrum (solvent: DMSO-d6, internal standard: tetramethylsilane) of the PVA-based resin saponified completely. Specifically, the content may be computed from the areas of peaks originating from hydroxy group protons, methine protons, and methylene protons in the 1,2-diol unit, methylene protons in the main chain, and protons in hydroxy groups bonded to the main chain.

In the present invention, one PVA-based resin may be used, or a mixture of two or more PVA-based resins may be used. When a mixture of two or more is used, a combination of the unmodified PVAs described above, a combination of the unmodified PVA and a PVA-based resin having the structural unit represented by general formula (14), a combination of PVA-based resins that have the structural unit represented by general formula (14) and differ in the degree of saponification, the degree of polymerization, the degree of modification, etc., and a combination of the unmodified PVA or a PVA-based resin having the structural unit represented by general formula (14) and another modified PVA-based resin etc. can be used.

[Biodegradable Laminate]

The biodegradable laminate of the present invention includes an aliphatic polyester-based resin layer and a PVA-based resin layer laminated on at least one surface of the aliphatic polyester-based resin layer with a bonding layer therebetween and has generally a three- to fifteen-layer structure, preferably a three- to seven-layer structure, and particularly preferably a five- to seven-layer structure. No particular limitation is imposed on the layer structure. Let the aliphatic polyester-based resin layer be denoted by a, the PVA-based resin layer be denoted by b, and the bonding layer be denoted by c. Then any of combinations a/c/b, a/c/b/c/a, a/b/c/b/c/b/a, etc. is possible. These aliphatic polyester-based resin layers, the PVA-based resin layers, and the bonding layers may be the same or different.

In a preferred layer structure, an aliphatic polyester-based resin layer is generally disposed on a layer that comes into contact with outside air or contents containing water, in order to prevent a reduction in the gas barrier properties of each PVA-based resin layer due to moisture absorption.

The thickness of the biodegradable laminate of the present invention is generally in the range of 1 to 30000 μm, particularly preferably in the range of 3 to 13000 μm, and most preferably in the range of 10 to 3000 μm.

As for the thicknesses of the layers forming the biodegradable laminate, the thickness of each aliphatic polyester-based resin layer is generally 0.4 to 14000 μm, preferably 1 to 6000 μm, and particularly preferably 4 to 1400 μm. If the thickness of the aliphatic polyester-based resin layer is excessively large, the biodegradable laminate tends to be excessively hard. If the thickness is excessively small, the biodegradable laminate tends to be brittle.

The thickness of each PVA-based resin layer is generally 0.1 to 1000 m, preferably 0.3 to 500 μm, and particularly preferably 1 to 100 μm. If the PVA-based resin layer is excessively thick, it tends to be hard and brittle. An excessively thin PVA-based resin layer is not preferred because the barrier properties tend to be low.

The thickness of each bonding layer is generally 0.1 to 500 μm, preferably 0.15 to 250 μm, and particularly preferably 0.5 to 50 μm. If the bonding layer is excessively thick, the appearance may be poor. If the bonding layer is excessively thin, the adhesion tends to be low.

The ratio of the thickness of the aliphatic polyester-based resin layer to the thickness of the PVA-based resin layer is generally 1 to 100 and preferably 2.5 to 50. When a plurality of the aliphatic polyester-based resin layers and a plurality of the PVA-based resin layers are present, the ratio of the total thickness of the aliphatic polyester-based resin layers to the total thickness of the PVA-based resin layers is used. If the ratio is excessively large, the barrier properties tend to be low. If the ratio is excessively low, the biodegradable laminate tends to be hard and brittle.

The ratio of the thickness of the bonding layer to the total thickness of the biodegradable laminate is generally 0.005 to 0.5 and preferably 0.01 to 0.3. When a plurality of the bonding layers are present, the ratio of the total thickness of the bonding layers to the total thickness of the biodegradable laminate is used. If the ratio is excessively large, the appearance tends to be poor. If the ratio is excessively low, the adhesion tends to be low.

The biodegradable laminate of the present invention can be produced by a known conventional molding method. Specifically, a melt molding method or a molding method from a solution state can be used. Examples of the melt molding method include a method in which a bonding resin and the PVA-based resin are melt extrusion-laminated sequentially or simultaneously onto a film or sheet of the aliphatic polyester-based resin, a method in which the bonding resin and the aliphatic polyester-based resin are melt extrusion-laminated sequentially or simultaneously onto a film or sheet of the PVA-based resin, and a method in which the aliphatic polyester-based resin, the bonding resin, and the PVA-based resin are coextruded.

Examples of the molding method from the solution state include a method including coating a film or sheet, for example, of the aliphatic polyester-based resin with a solution prepared by dissolving the bonding resin in a good solvent, drying the film or sheet, and then coating the resulting film or sheet with an aqueous solution of the PVA-based resin.

Of these, the melt molding method is preferred, and the coextrusion method is used preferably because the biodegradable laminate can be produced in one step and is excellent in interlayer adhesiveness. When the melt molding method is used, it is preferable that the PVA-based resin used has the 1,2-diol structure in its side chains.

Examples of the coextrusion method include an inflation method, a T-die method, a multi-manifold die method, a feed block method, and a multi-slot die method. As for the shape of a die used in a method in which bonding is performed outside the die, a T-die, a circular die, etc. can be used.

The melt-molding temperature during melt-extrusion is in the range of generally 170 to 250° C. and preferably 180 to 230° C.

The biodegradable laminate of the present invention may be further subjected to heat stretching treatment. With the stretching treatment, the strength of the biodegradable laminate and the gas barrier properties are expected to be improved.

In particular, in the biodegradable laminate of the present invention, when the PVA-based resin used has the 1,2-diol structure in its side chains, the stretchability of the biodegradable laminate is improved.

A well-known stretching method can be used for the stretching treatment etc.

Examples of the stretching treatment include: uniaxial and biaxial stretching methods in which opposite ends of a multilayer structure sheet are held to increase the width of the sheet; molding methods using a die, such as a deep drawing molding method, a vacuum molding method, an air-pressure molding method, and a vacuum air-pressure molding method, in which a multilayer structure sheet is stretched using the die; and a method in which a preformed multilayer structure body such as a parison is processed using a tubular stretching method, a stretch blow method, etc.

The stretching method used is preferably the uniaxial or biaxial stretching method when a target molded article is a film- or sheet-shaped body.

When the die molding method such as the deep drawing molding method, the vacuum molding method, the air-pressure molding method, or the vacuum air-pressure molding method is used, it is preferable that the biodegradable laminate is heated uniformly using a hot-air oven or a heater oven or both and then stretched using a chuck, a plug, a vacuum force, an air-pressure force, etc.

When a target molded article is a cup, a tray, etc. with a drawing ratio (the depth (mm) of the molded article/the maximum diameter (mm) of the molded article) of generally 0.1 to 3, it is preferable to use the die molding method, such as the deep drawing molding method, the vacuum molding method, the air-pressure molding method, or the vacuum air-pressure molding method, in which stretching is performed using a die.

In the thus-obtained biodegradable laminate of the present invention, the interlayer adhesion between the aliphatic polyester-based resin layer and the bonding layer and also the interlayer adhesion between the PVA-based resin layer and the bonding layer are high.

When the above-described modified polyester-based resin (D) is used as the bonding resin of the bonding layer, the bonding resin is also biodegradable because the basic skeleton of the modified polyester-based resin (D) is the aliphatic polyester-based resin (d), and the biodegradable laminate of the present invention containing the modified polyester-based resin (D) is also excellent in biodegradability.

The biodegradable laminate of the present invention has mechanical strength, flexibility, transparency, water resistance, moisture resistance, and biodegradability that are attributed to the aliphatic polyester-based resin layer and has mechanical strength, gas barrier properties, transparency, and biodegradability that are attributed to the PVA-based resin layer. The aliphatic polyester-based resin layer and the PVA-based resin layer are firmly bonded to each other through the bonding layer, and the bonding layer can be biodegradable. Therefore, the biodegradable laminate of the present invention is completely biodegradable and excellent in water vapor and oxygen barrier properties.

The biodegradable laminate of the present invention may be subjected to various types of secondary processing for the purpose of imparting chemical function, electrical function, magnetic function, mechanical function, frictional/abrasive/lubricating function, optical function, thermal function, and surface function such as biocompatibility. Examples of the secondary processing include embossing, painting, bonding, printing, metalizing (plating etc.), mechanical processing, and surface treatment (such as antistatic treatment, corona discharge treatment, plasma treatment, photochromism treatment, physical vapor deposition, chemical vapor deposition, and coating).

[Applications]

The biodegradable laminate of the present invention is used preferably for a wide variety of applications such as packaging materials for packaging liquid materials, powdery materials, and solid materials such as various foods, chemicals, and sundry goods, agricultural materials, building materials, etc. Specific examples the applications include injection molded articles (such as trays for perishables, coffee capsules, fast food containers, and outdoor leisure products), extrusion molded articles (such as films, fishing lines, fishing nets, slope protecting and greening nets, and water-retaining sheets), and hollow molded articles (such as bottles).

Other examples include agricultural films, coating materials, fertilizer coating materials, laminate films, plates, stretched sheets, monofilaments, nonwoven fabrics, flat yarns, staples, crimped fibers, streaked tapes, split yarns, composite fibers, blow bottles, shopping bags, garbage bags, compost bags, cosmetic containers, detergent containers, bleach containers, ropes, binding materials, sanitary cover stock materials, cooler boxes, cushioning films, multifilaments, synthetic paper sheets, and medical materials such as surgical threads, sutures, artificial bones, artificial skins, DDSs such as microcapsules, and wound covering materials.

More preferred examples include: packaging materials such as packaging films, bags, trays, bottles, cushioning foams, and fish boxes; and agricultural materials such as mulching films, tunnel films, house films, sunshades, weed-proof sheets, ridge sheets, sprouting sheets, slope protecting and greening mats, seedling beds, and flowerpots.

The molded article of the present invention is excellent in mechanical properties such as impact resistance, tensile strength, and tensile elongation at break, biodegradability, etc. and is used particularly preferably for applications such as films and sheets.

EXAMPLES

Specific modes of the present invention will be described in more detail by way of Examples. However, the present invention is not limited to the following Examples so long as the invention does not depart from the scope thereof.

Various production conditions and the values of evaluation results in the following Examples have meanings as preferred upper or lower limits in the embodiments of the present invention, and preferred ranges may be ranges defined by any combination of the above-described upper or lower limit values and values in the following Examples or any combination of the values in the following Examples.

[Measurement of Melt Flow Rate (MFR) of Resins Used]

The measurement was performed using a melt indexer at 190° C. and a load of 2.16 kg according to JIS K7210 (1999). The unit of the melt flow rate is g/10 minutes. However, the melt flow rate of G-Polymer was measured at 210° C. and a load of 2.16 kg.

[Raw Materials Used]

Resins and other raw materials used in Examples and Comparative Examples are as follows.

"PBS" stands for "polybutylene succinate," and "PBSA" stands for "polybutylene succinate adipate." "PLA" stands for "polylactic acid," and "PBAT" stands for "polybutylene adipate terephthalate."

<Aliphatic Polyester-Based Resin (A)>

PBS (BioPBS FZ91PM manufactured by PTTMCC Biochem, MFR: 5.0 g/10 minutes, melting point: 113° C.)

PBSA (BioPBS FD92PM manufactured by PTTMCC Biochem, amount of succinic acid unit based on total amount of dicarboxylic acid units: 74% by mole, MFR: 5.0 g/10 minutes, melting point: 89° C.)

<Polyhydroxyalkanoate (B)>

PHBH (Aonilex X131A manufactured by Kaneka Corporation, molar ratio of 3HB/3HH: 94/6, MFR: 6.0 g/10 minutes, melting point: 140° C.)

<Polylactic Acid>

PLA (4032D manufactured by NatureWorks, MFR: 3.5 g/10 minutes, melting point: 170° C.)

<Inorganic Filler (C)>

Talc (MG-115 manufactured by FUJI TALC INDUSTRIAL CO., LTD., average particle diameter: 14 μm)

<Bonding Resin>

PBAT (Ecoflex C1200 manufactured by BASF, MFR: 3.8 g/10 minutes, melting point: 115° C.)

PBSA (BioPBS FD92PM manufactured by PTTMCC Biochem, amount of succinic acid unit based on total amount of dicarboxylic acid units: 74% by mole, MFR: 5.0 g/10 minutes, melting point: 89° C.)

Maleic anhydride (manufactured by NIPPON SHOKUBAI Co., Ltd.)

Radical initiator: 2,5-dimethyl-2,5-bis(t-butyloxy)hexane (PERHEXA 25B manufactured by NOF CORPORATION)

Radical initiator: dibenzoyl peroxide (NYPER BMT manufactured by NOF CORPORATION)

MODIC-TPC (GK320 manufactured by Mitsubishi Chemical Corporation, MFR: 10 g/10 minutes, melting point: 185° C.)

Antioxidant: Songnox 1010(manufactured by Songwon)

Antioxidant: Irgafos 168 (manufactured by BASF)

Antioxidant: Hostanox P-EPQ (manufactured by Clariant Chemicals)

<PVA-Based Resin>

G-Polymer (BVE8049P manufactured by The Nippon Synthetic Chemical Industry Co., Ltd., MFR: 4.0 g/10 minutes, melting point: 185° C.)

<Other>

EVOH (EVAL F101B manufactured by KURARAY Co., Ltd., MFR: 1.6 g/10 minutes, melting point: 183° C.)

[Production of Aliphatic Polyester-Based Resin Compositions]

<Production of Aliphatic Polyester-Based Resin Composition (a-1)>

A mixture obtained by dry-blending 56 parts by mass of PHBH, 24 parts by mass of PBSA, 20 parts by mass of talc was melt-kneaded using a twin screw extruder TEX30α59.5AW-15V (manufactured by Japan Steel Works, Ltd., D=30 mm ϕ, L/D=60) at a temperature of 140° C., a screw rotation speed of 200 rpm, and an extrusion amount of 20 kg/h. Then the melt-kneaded product was extruded into a string form, cooled, and then cut to thereby obtain pellets of an aliphatic polyester-based resin composition (a-1). The MFR of the aliphatic polyester-based resin composition (a-1) was 8.0 g/10 minutes.

<Production of Aliphatic Polyester-Based Resin Composition (a-2)>

A mixture obtained by dry-blending 28 parts by mass of PHBH, 42 parts by mass of PBSA, and 30 parts by mass of talc was melt-kneaded using a twin screw extruder TEX30α59.5AW-15V (manufactured by The Japan Steel Works, Ltd., D=30 mm ϕ, L/D=60) at a temperature of 140° C., a screw rotation speed of 200 rpm, and an extrusion amount of 20 kg/h. Then the melt-kneaded product was extruded into a string form, cooled, and then cut to thereby obtain pellets of an aliphatic polyester-based resin composition (a-2). The MFR of the aliphatic polyester-based resin composition (a-2) was 13 g/10 minutes.

<Production of Modified Polyester-Based Resin (c-1)>

A mixture obtained by using 100 parts by mass of PBAT and dry-blending the PBAT, 0.5 parts by mass of maleic anhydride, and 0.25 parts by mass of PERHEXA 25B used as a radical initiator was melt-kneaded using a twin screw extruder TEX25αIII-52.5CW-3V (manufactured by The Japan Steel Works, Ltd., D=25 mm ϕ, L/D=53) at a temperature of 210° C. and a screw rotation speed of 200 rpm. Then the melt-kneaded product was extruded into a string form, cooled, and then cut to thereby obtain pellets of a modified polyester-based resin (c-1). The MFR of the modified polyester-based resin (c-1) was 0.3 g/10 minutes.

<Production of Modified Polyester-Based Resin (c-2)>

A mixture obtained by using 100 parts by mass of PBAT and dry-blending the PBAT, 0.35 parts by mass of maleic anhydride, 0.25 parts by mass of PERHEXA 25B used as a radical initiator, 0.1 parts by mass of Songnox 1010, and 0.1 parts by mass of Irgafos 168 was melt-kneaded using a twin screw extruder TEX25αIII-52.5CW-3V (manufactured by The Japan Steel Works, Ltd., D=25 mm ϕ, L/D=53) at a temperature of 210° C., a screw rotation speed of 240 rpm, and an extrusion amount of 10 kg/h. Then the melt-kneaded product was extruded into a string form, cooled, and then cut to thereby obtain pellets of a modified polyester-based resin (c-2). The MFR of the modified polyester-based resin (c-2) was 0.4 g/10 minutes.

<Production of Modified Polyester-Based Resin (c-3)>

A mixture obtained by using 100 parts by mass of PBAT and dry-blending the PBAT, 0.5 parts by mass of maleic anhydride, 0.3 parts by mass of PERHEXA 25B used as a radical initiator, 0.1 parts by mass of Songnox 1010, and 0.1 parts by mass of Irgafos 168 was melt-kneaded using a twin screw extruder TEX25αIII-52.5CW-3V (manufactured by The Japan Steel Works, Ltd., D=25 mm ϕ, L/D=53) at a temperature of 210° C., a screw rotation speed of 240 rpm, and an extrusion amount of 10 kg/h. Then the melt-kneaded product was extruded into a string form, cooled, and then cut to thereby obtain pellets of a modified polyester-based resin (c-3). The MFR of the modified polyester-based resin (c-3) was 0.5 g/10 minutes.

<Production of Modified Polyester-Based Resin (c-4)>

A mixture obtained by using 70 parts by mass of PBAT and 30 parts by mass of PBSA and dry-blending the PBAT, the PBSA, 0.35 parts by mass of maleic anhydride, 0.25 parts by mass of PERHEXA 25B used as a radical initiator, 0.3 parts by mass of Songnox 1010, and 0.3 parts by mass of Irgafos 168 was melt-kneaded using a twin screw extruder TEX25αIII-52.5CW-3V (manufactured by The Japan Steel Works, Ltd., D=25 mm ϕ, L/D=53) at a temperature of 210° C., a screw rotation speed of 240 rpm, and an extrusion amount of 10 kg/h. Then the melt-kneaded product was extruded into a string form, cooled, and then cut to thereby obtain pellets of a modified polyester-based resin (c-4). The MFR of the modified polyester-based resin (c-4) was 0.1 g/10 minutes.

<Production of Modified Polyester-Based Resin (c-5)>

A mixture obtained by using 80 parts by mass of PBAT and 20 parts by mass of PBSA and dry-blending the PBAT, the PBSA, 0.35 parts by mass of maleic anhydride, 0.25 parts by mass of PERHEXA 25B used as a radical initiator, 0.3 parts by mass of Songnox 1010, and 0.3 parts by mass of Irgafos 168 was melt-kneaded using a twin screw extruder TEX25αIII-52.5CW-3V (manufactured by The Japan Steel Works, Ltd., D=25 mm ϕ, L/D=53) at a temperature of 210° C., a screw rotation speed of 240 rpm, and an extrusion amount of 10 kg/h. Then the melt-kneaded product was extruded into a string form, cooled, and then cut to thereby obtain pellets of a modified polyester-based resin (c-5). The MFR of the modified polyester-based resin (c-5) was 0.2 g/10 minutes.

<Production of Modified Polyester-Based Resin (c-6)>

A mixture obtained by dry-blending 80 parts by mass of the modified polyester-based resin (c-3), 20 parts by mass of PBSA, 0.1 parts by mass of Songnox 1010, and 0.1 parts by mass of Irgafos 168 was melt-kneaded using a twin screw extruder PCM30-30-2V (manufactured by Ikegai Corp., D=30 mm ϕ, L/D=30) at a temperature of 160° C., a screw rotation speed of 250 rpm, and an extrusion amount of 12 kg/h. Then the melt-kneaded product was extruded into a string form, cooled, and then cut to thereby obtain pellets of a modified polyester-based resin (c-6). The MFR of the modified polyester-based resin (c-6) was 1.6 g/10 minutes.

<Production of Modified Polyester-Based Resin (c-7)>

A mixture obtained by dry-blending 70 parts by mass of the modified polyester-based resin (c-3), 30 parts by mass of PBSA, 0.1 parts by mass of Songnox 1010, and 0.1 parts by mass of Irgafos 168 was melt-kneaded using a twin screw extruder PCM30-30-2V (manufactured by Ikegai Corp., D=30 mm ϕ, L/D=30) at a temperature of 160° C., a screw rotation speed of 250 rpm, and an extrusion amount of 12 kg/h. Then the melt-kneaded product was extruded into a string form, cooled, and then cut to thereby obtain pellets of a modified polyester-based resin (c-7). The MFR of the modified polyester-based resin (c-7) was 1.8 g/10 minutes.

<Production of Modified Polyester-Based Resin (c-8)>

A mixture obtained by dry-blending 60 parts by mass of the modified polyester-based resin (c-3), 40 parts by mass of PBSA, 0.1 parts by mass of Songnox 1010, and 0.1 parts by mass of Irgafos 168 was melt-kneaded using a twin screw extruder PCM30-30-2V (manufactured by Ikegai Corp., D=30 mm ϕ, L/D=30) at a temperature of 160° C., a screw rotation speed of 250 rpm, and an extrusion amount of 12 kg/h. Then the melt-kneaded product was extruded into a string form, cooled, and then cut to thereby obtain pellets of a modified polyester-based resin (c-8). The MFR of the modified polyester-based resin (c-8) was 2.2 g/10 minutes.
<Production of Modified Polyester-Based Resin (c-9)>

A mixture obtained by dry-blending 50 parts by mass of the modified polyester-based resin (c-3), 50 parts by mass of PBSA, 0.1 parts by mass of Songnox 1010, and 0.1 parts by mass of Irgafos 168 was melt-kneaded using a twin screw extruder PCM30-30-2V (manufactured by Ikegai Corp., D=30 mm φ, L/D=30) at a temperature of 160° C., a screw rotation speed of 250 rpm, and an extrusion amount of 12 kg/h. Then the melt-kneaded product was extruded into a string form, cooled, and then cut to thereby obtain pellets of a modified polyester-based resin (c-9). The MFR of the modified polyester-based resin (c-9) was 2.7 g/10 minutes.
<Production of Modified Polyester-Based Resin (c-10)>

A mixture obtained by using 80 parts by mass of PBAT and 20 parts by mass of PBSA and dry-blending the PBAT, the PBSA, 0.5 parts by mass of maleic anhydride, 0.3 parts by mass of PERHEXA 25B used as a radical initiator, 0.3 parts by mass of Songnox 1010, 0.3 parts by mass of Irgafos 168, and 0.3 parts by mass of Hostanox P-EPQ was melt-kneaded using a twin screw extruder TEX25αIII-52.5CW-3V (manufactured by The Japan Steel Works, Ltd., D=25 mm L/D=53) at a temperature of 210° C., a screw rotation speed of 240 rpm, and an extrusion amount of 10 kg/h. Then the melt-kneaded product was extruded into a string form, cooled, and then cut to thereby obtain pellets of a modified polyester-based resin (c-10). The MFR of the modified polyester-based resin (c-10) was 0.7 g/10 minutes.
<Production of Modified Polyester-Based Resin (c-11)>

A mixture obtained by using 100 parts by mass of PBSA and dry-blending the PBSA, 1.5 parts by mass of maleic anhydride, and 0.2 parts by mass of NYPER BMT used as a radical initiator was melt-kneaded using a twin screw extruder TEX25αIII-52.5CW-3V (manufactured by The Japan Steel Works, Ltd., D=25 mm φ, L/D=53) at a temperature of 200° C., a screw rotation speed of 240 rpm, and an extrusion amount of 10 kg/h, Then the melt-kneaded product was extruded into a string form, cooled, and then cut to thereby obtain pellets of a modified polyester-based resin (c-11). The MFR of the modified polyester-based resin (c-11) was 1.3 g/10 minutes.
<Production of Modified Polyester-Based Resin (c-12)>

A mixture obtained by dry-blending 50 parts by mass of the modified polyester-based resin (c-1) and 50 parts by mass of the modified polyester-based resin (c-11) was melt-kneaded using a twin screw extruder PCM30-30-2V (manufactured by Ikegai Corp., D=30 mm φ, L/D=30) at a temperature of 200° C., a screw rotation speed of 150 rpm, and an extrusion amount of 10 kg/h. Then the melt-kneaded product was extruded into a string form, cooled, and then cut to thereby obtain pellets of a modified polyester-based resin (c-12). The MFR of the modified polyester-based resin (c-12) was 0.5 g/10 minutes.
<Production of Modified Polyester-Based Resin (c-13)>

A mixture obtained by dry-blending 70 parts by mass of the modified polyester-based resin (c-1) and 30 parts by mass of the modified polyester-based resin (c-11) was melt-kneaded using a twin screw extruder PCM30-30-2V (manufactured by Ikegai Corp., D=30 mm φ, L/D=30) at a temperature of 200° C., a screw rotation speed of 150 rpm, and an extrusion amount of 10 kg/h. Then the melt-kneaded product was extruded into a string form, cooled, and then cut to thereby obtain pellets of a modified polyester-based resin (c-13). The MFR of the modified polyester-based resin (c-13) was 0.3 g/10 minutes.

Examples 1 to 101

A resin used for each layer is shown in Tables 1 and 2. A T die molding machine was used to mold a five-layer sheet including three types of layers arranged in an a/c/b/c/a sequence (a: surface layer, c: bonding layer, b: intermediate layer (barrier layer). The molding temperature was 210° C., and a line speed of 5 m/min was used. The thicknesses of the layers a/c/b/c/a in the layer structure were 565/20/30/20/565 μm, and the total thickness of the sheet was 1200 μm.

Examples 11 to 16 and Comparative Examples 1 to 2

A resin used for each layer is shown in Tables 2 and 3. A T die molding machine was used to mold a five-layer sheet including three types of layers arranged in an a/c/b/c/a sequence (a: surface layer, c: bonding layer, b: intermediate layer (barrier layer). The molding temperature was 210° C., and a line speed of 5 m/min was used. The thicknesses of the layers a/c/b/c/a in the layer structure were 360/20/30/20/360 μm, and the total thickness of the sheet was 790 μm.

For each of the laminate sheets obtained, bonding strength, water vapor permeability, oxygen permeability, and biodegradability were evaluated by the following methods. The results are shown in Tables 1 to 3.

In Tables 1 to 3, the symbol "○" in the evaluation of primary processability indicates that it was possible to mold a laminate sheet.
<Bonding Strength>

One of the laminate sheets was cut into a strip with a width of 15 mm, and the bonding strength between one layer a and four layers c/b/c/a was measured by a T-type peeling test at a peeling speed of 300 mm/minute, and the value measured was evaluated according to the following criteria.

⊙: The bonding strength was 20 N or more, or material fracture occurred, so that the bonding strength was not measurable (the bonding strength is high).

○: The bonding strength was 5 N or more and less than 20 N.

Δ: The bonding strength was 1 N or more and less than 5 N.

X: The bonding strength was less than 1 N.
<Water Vapor Permeability>

The measurement was performed using a cup method according to JIS Z0208 (1976). The evaluation was performed under the measurement conditions of 40° C. and 90% RH, and the measured value was evaluated according to the following criteria.

○: The water vapor permeability was 15 cc/m$^2$·day or less (the water vapor barrier property is high).

X: The water vapor permeability was more than 15 cc/m$^2$·day.
<Oxygen Permeability>

The measurement was performed according to JIS K7126 (2006) under the conditions of a temperature of 23° C. and a humidity of 65% RH using a measurement device (device name: OXTRAN) manufactured by MOCON, U.S., and the measured value was evaluated according to the following criteria.

○: The oxygen permeability was 10 g/m$^2$·day or less (the oxygen barrier property is high).

X: The oxygen permeability was more than 10 g/m$^2$·day.
<Biodegradability Test for Adhesive Resin Compositions (Examples 1 to 10)>

Using a T die molding machine, 100 m-thick monolayer sheets were obtained using the same resins as the modified polyester-based resins c-1 to c-10 used for the bonding layers in Examples 1 to 10. Each of the monolayer sheets obtained was stored in microbially active soil. Then the appearance of the sheet was observed, and its mass was measured. The results were evaluated according to the flowing criteria. As for the biodegradability, the monolayer sheet was stored in the soil for 10 weeks, and the measurement was performed on the sheet removed from the soil at intervals of two weeks (a total of 5 times). Among the measured weight reduction amounts per 2 weeks, the maximum weight reduction amount per 2 weeks was used as a maximum weight reduction rate. Then the weight reduction after 52 weeks was computed using the gradient of the maximum weight reduction rate. The temperature of evaluation was set to 28±2° C.

⊙: The computed decomposition rate at 52 weeks was 90% or more.

○: The computed decomposition rate at 52 weeks was 50% or more and less than 90%.

Δ: The computed decomposition rate at 52 weeks was 15% or more and less than 50%.

X: The computed decomposition rate at 52 weeks was 15% or less.

<Biodegradability Test for Laminates (Examples 11 to 16 and Comparative Examples 1 and 2)>

Each of the laminate sheets obtained by the above method was stored in microbially active soil for 12 months. Then the appearance of the laminate sheet and its mass were measured, and the biodegradability was evaluated according to the following criteria. The temperature of evaluation was set to 28±2° C.

○: Complete biodegradation was achieved.

X: Almost no biodegradation was achieved.

[Appearance]

A T die molding machine was used to mold a monolayer sheet of each bonding resin. The temperature of molding was 160° C., and the line speed was set to 2 m/min. The thickness of the sheet obtained was 100 m, and its appearance was evaluated according to the following criteria.

○: Almost no seeds, fisheyes, and unevenness were found in the monolayer sheet.

Δ: Although many appearance defects were present, the monolayer film could be molded.

X: A large number of defects (holes and tears) were formed during molding of the monolayer sheet (film).

[Evaluation of Secondary Processability During Vacuum Molding and Heat Resistance]

For each of the laminate sheets obtained in Examples 1 to 16 and Comparative Examples 1 and 2, an FKS type compact multifunction pressure and vacuum forming machine manufactured by Asano Laboratories Co., Ltd. was used to produce a container using a die 1 having a shape described in FIG. 1 by plug-assisted vacuum forming with the output of upper and lower heaters set to 60% to 90%.

The following heat resistance test was performed on each of the molded articles obtained. The results are shown in Tables 1 to 3. In Tables 1 to 3, the symbol "0" in the evaluation of secondary processability means that it was possible to form a container.

<Heat Resistance Test>

Each molded article was immersed in hot water at 90° C., and the state of the container was checked and evaluated according to the following criteria.

○: No change at all.

X: Deformed.

TABLE 1

|  |  | Example 1 | Example 2 | Example 3 | Example 4 | Example 5 | Example 6 |
|---|---|---|---|---|---|---|---|
| Layer structure | Layer a (surface layer) | a-1 | a-1 | a-1 | a-1 | a-1 | a-1 |
|  | Layer c (bonding layer) | c-1 | c-2 | c-3 | c-4 | c-5 | c-6 |
|  | Layer b (intermediate layer) | G-Polymer | G-Polymer | G-Polymer | G-Polymer | G-Polymer | G-Polymer |
| Evaluation results | Primary processability | ○ | ○ | ○ | ○ | ○ | ○ |
|  | Bonding strength | ⊙ | ⊙ | ⊙ | ⊙ | ⊙ | ⊙ |
|  | Water vapor permeability | Not evaluated | Not evaluated | Not evaluated | Not evaluated | ○ | ○ |
|  | Oxygen permeability | Not evaluated | Not evaluated | Not evaluated | Not evaluated | ○ | ○ |
|  | Biodegradability | Δ | Δ | Δ | ○ | Δ | ○ |
|  | Maximum reduction rate per two weeks | 0.8% | 0.8% | 0.7% | 2.0% | 0.7% | 1.7% |
|  | Decomposition rate after 52 weeks (computed value) | 21% | 21% | 18% | 52% | 18% | 44% |
|  | Appearance | Δ | ○ | ○ | X | Δ | ○ |
|  | Secondary processability | ○ | ○ | ○ | ○ | ○ | ○ |
|  | Heat resistance | ○ | ○ | ○ | ○ | ○ | ○ |

TABLE 2

|  |  | Example 7 | Example 8 | Example 9 | Example 10 | Example 11 | Example 12 |
|---|---|---|---|---|---|---|---|
| Layer structure | Layer a (surface layer) | a-1 | a-1 | a-1 | a-1 | a-2 | a-2 |
|  | Layer c (bonding layer) | c-7 | c-8 | c-9 | c-10 | c-11 | c-12 |
|  | Layer b (intermediate layer) | G-Polymer | G-Polymer | G-Polymer | G-Polymer | G-Polymer | G-Polymer |

TABLE 2-continued

|  |  | Example 7 | Example 8 | Example 9 | Example 10 | Example 11 | Example 12 |
|---|---|---|---|---|---|---|---|
| Evaluation results | Primary processability | ○ | ○ | ○ | ○ | ○ | ○ |
|  | Bonding strength | ⊙ | ⊙ | ○ | ⊙ | Δ | Δ |
|  | Water vapor permeability | ○ | Not evaluated | Not evaluated | ○ | Not evaluated | ○ |
|  | Oxygen permeability | ○ | Not evaluated | Not evaluated | ○ | Not evaluated | ○ |
|  | Biodegradability | ⊙ | Not evaluated | Not evaluated | Δ | Not evaluated | ○ |
|  | Maximum reduction rate per two weeks | 3.5% | — | — | 0.7% | — | — |
|  | Decomposition rate after 52 weeks (computed value) | 91% | — | — | 18% | — | — |
|  | Appearance | ○ | ○ | ○ | Δ | X | X |
|  | Secondary processability | ○ | ○ | ○ | ○ | ○ | ○ |
|  | Heat resistance | ○ | ○ | ○ | ○ | ○ | ○ |

TABLE 3

|  |  | Example 13 | Example 14 | Example 15 | Example 16 | Comparative Example 1 | Comparative Example 2 |
|---|---|---|---|---|---|---|---|
| Layer structure | Layer a (surface layer) | a-2 | a-1 | a-1 | a-2 | PLA | PLA |
|  | Layer c (bonding layer) | c-13 | c-12 | c-13 | c-1 | MODIC-TPC | c-1 |
|  | Layer b (intermediate layer) | G-Polymer | G-Polymer | G-Polymer | G-Polymer | EVOH | G-Polymer |
| Evaluation results | Primary processability | ○ | ○ | ○ | ○ | ○ | ○ |
|  | Bonding strength | ○ | ○ | ○ | ○ | Not evaluated | ○ |
|  | Water vapor permeability | Not evaluated | ○ | Not evaluated | Not evaluated | X | X |
|  | Oxygen permeability | Not evaluated | ○ | Not evaluated | Not evaluated | ○ | ○ |
|  | Biodegradability | Not evaluated | ○ | Not evaluated | Not evaluated | X | X |
|  | Maximum reduction rate per two weeks | — | — | — | — | — | — |
|  | Decomposition rate after 52 weeks (computed value) | — | — | — | — | — | — |
|  | Appearance | X | Δ | Δ | Δ | ○ | ○ |
|  | Secondary processability | ○ | ○ | ○ | ○ | ○ | ○ |
|  | Heat resistance | ○ | ○ | ○ | ○ | X | X |

As can be seen from the above results, the biodegradable laminate of the present invention is excellent in biodegradability, water vapor barrier property, oxygen barrier property, heat resistance, and moldability.

Although the present invention has been described in detail by way of the specific modes, it is apparent for those skilled in the art that various changes can be made without departing from the spirit and scope of the present invention.

The present application is based on Japanese Patent Application No. 2018-067298 filed on Mar. 30, 2018, the entire contents of which are incorporated herein by reference.

REFERENCE SIGNS LIST 1 die

The invention claimed is:
1. A biodegradable laminate, comprising:
an aliphatic polyester-based resin layer;
a bonding layer; and
a polyvinyl alcohol-based resin layer laminated on at least one surface of the aliphatic polyester-based resin layer with the bonding layer therebetween,
wherein the aliphatic polyester-based resin layer comprises an aliphatic polyester-based resin composition comprising:
(A) an aliphatic polyester-based resin comprising, in polymerized form, (A1) succinate, (A2) 1,4-butanediol, and optionally (A3) a further aliphatic dicarboxylate, with a molar ratio of the succinate unit to all dicarboxylate units in the aliphatic polyester-based resin (A) being in a range from 68 to 100%;
(B) a polyhydroxyalkanoate comprising, in polymerized form, (B1) a 3-hydroxybutyrate in at least 85 mol. %, and and (B2) 3-hydroxyhexanoate;
optionally, (Q) an additional resin other than the aliphatic polyester-based resin (A) and the polyhydroxyalkanoate (B); and
(C) an inorganic filler,
wherein a mass ratio of the total amount of the aliphatic polyester-based resin (A), the polyhydroxyalkanoate

(B), the filler (C), and the additional resin (Q) relative to the aliphatic polyester-based resin layer is in a range of from 60 to 100% by mass, wherein an [(A)+(B)]/[(A)+(B)+(Q)] mass ratio, of a sum of the aliphatic polyester-based resin (A) and the polyhydroxyalkanoate (B) to a sum of the aliphatic polyester-based resin (A), the polyhydroxyalkanoate (B), and the additional resin (Q), is in a range of from 70 to 100% by mass, wherein a (C)/[(A)+(B)+(C)] ratio, of the inorganic filler (C) relative to a total amount of the aliphatic polyester-based resin (A), the polyhydroxyalkanoate (B), and the inorganic filler (C) in the aliphatic polyester-based resin composition, is in a range from 15 to 50% by mass, and wherein an (A)/(B) mass ratio, of the aliphatic polyester-based resin (A) to the polyhydroxyalkanoate (B) comprised in the aliphatic polyester-based resin composition, is in a range of from 70/30 to 20/80.

2. The laminate of claim 1, wherein the (A)/(B) mass ratio is in a range of from 65/45 to 20/80.

3. The laminate of claim 1, wherein the inorganic filler (C) comprises talc, calcium carbonate, zeolite, mica, and/or clay.

4. The laminate of claim 1, wherein the bonding layer comprises a modified polyester-based resin (D) comprising a polyester-based resin (d), mainly comprising the aliphatic polyester-based resin (A) and/or an aliphatic-aromatic polyester-based resin (A), grafted with an α,β-unsaturated carboxylic acid and/or an anhydride thereof, as an adhesive resin composition.

5. The laminate of claim 1, wherein the (C)/[(A)+(B)+(C)] ratio is in a range of from greater than 20 to 50% by mass.

6. The laminate of claim 1, wherein the (C)/[(A)+(B)+(C)] ratio is in a range of from greater than 30 to 50% by mass.

7. The laminate of claim 1, wherein the inorganic filler (C) is talc.

8. The laminate of claim 1, having a decomposition rate over 52 weeks stored in soil at 28±2° C. in a range of from 18 to 91%.

9. The laminate of claim 1, wherein the polyhydroxyalkanoate (B) comprises the 3-hydroxybutyrate in a range of from 85 to 97 mol. %.

10. The laminate of claim 1, wherein the polyvinyl alcohol-based resin layer has a thickness in a range of from 0.3 to 1,000 μm.

11. The laminate of claim 10, wherein the bonding layer has a thickness in a range of from 0.1 to 500 μm, wherein the aliphatic polyester-based resin layer has a thickness in a range of from 0.4 to 14,000 μm, and wherein a ratio of the thickness of the aliphatic polyester-based resin layer to the thickness of the PVA-based resin layer is in a range of from 2.5 to 50.

12. The laminate of claim 1, wherein the inorganic filler (C) comprises a silicate, a hydroxide, anhydrous silica, isinglass, talc, mica, clay, titanium oxide, calcium carbonate, diatomaceous earth, allophane, bentonite, potassium titanate, zeolite, sepiolite, smectite, kaolin, kaolinite, glass, limestone, carbon, wollastonite, calcined pearlite, aluminum oxide, magnesium carbonate, ferric carbonate, zinc oxide, iron oxide, aluminum phosphate, and/or barium sulfate.

13. The laminate of claim 1, wherein the polyester-based resin (A) comprises polybutylene succinate and/or polybutylene succinate adipate.

14. The laminate of claim 1, wherein the inorganic filler (C) has an average diameter in a range of from 0.5 to 50 μm.

15. The laminate of claim 1, wherein the additional resin (Q) is at least one selected from the group consisting of an aromatic polyester-based resin, polycarbonate, polyamide, polystyrene, polyolefin, acrylic resin, amorphous polyolefin, ABS, acrylonitrilestyrene, polycaprolactone, polyvinyl alcohol, cellulose ester, a biodegradable polylactic acid, a biodegradable polybutylene adipate terephthalate, and a mixture thereof.

16. The laminate of claim 1, wherein the further aliphatic dicarboxylate (A3) is present and comprises adipate.

17. The laminate of claim 1, wherein the further aliphatic dicarboxylate (A3) is present and comprises suberate, azelate, and/or sebacate.

18. The laminate of claim 1, wherein the further aliphatic dicarboxylate (A3) is present and comprises an aliphatic oxycarboxylic acid.

19. A biodegradable laminate, comprising:
(i) an aliphatic polyester-based resin layer of (A) an aliphatic polyester-based resin, (B) a first polyhydroxyalkanoate, (C) an organic filler, and optionally, (Q) additional resin(s), the aliphatic polyester-based resin (A), the first polyhydroxyalkanoate (B), together making out a total amount of 70 to 100 wt. % of the aliphatic polyester-based resin layer (i), based on all resin components;
(ii) a bonding layer of a modified polyester-based resin (D); and
(iii) a polyvinyl alcohol-based resin layer laminated on at least one surface of the aliphatic polyester-based resin layer (i) with the bonding layer therebetween, wherein the aliphatic polyester-based resin (A) comprises, in polymerized form, succinate and 1,4-butanediol, the succinate unit being in a range from 68 to 100 mol. %, relative to all dicarboxylate units in the aliphatic polyester-based resin (A), wherein the first polyhydroxyalkanoate (B) comprises, in polymerized form, 3-hydroxybutyrate and 3-hydroxyhexanoate, the 3-hydroxybutyrate being at least 85 mol. % of the first polyhydroxyalkanoate (B), wherein the inorganic filler (C) comprises a silicate, a hydroxide, anhydrous silica, isinglass, talc, mica, clay, titanium oxide, calcium carbonate, diatomaceous earth, allophane, bentonite, potassium titanate, zeolite, sepiolite, smectite, kaolin, kaolinite, glass, limestone, carbon, wollastonite, calcined pearlite, aluminum oxide, magnesium carbonate, ferric carbonate, zinc oxide, iron oxide, aluminum phosphate, and/or barium sulfate, wherein the inorganic filler (C) is present in the aliphatic polyester-based resin composition in a range from 15 to 50 wt. % relative to a total weight of the aliphatic polyester-based resin (A), the first polyhydroxyalkanoate (B), and the inorganic filler (C), and wherein the additional resin (Q) is different than the aliphatic polyester-based resin (A) and the first polyhydroxyalkanoate (B).

20. The laminate of claim 19, wherein the aliphatic polyester-based resin (A) comprises, in polymerized form, a further aliphatic dicarboxylate.

21. The laminate of claim 19, wherein the first polyhydroxyalkanoate (B) is 3-hydroxybutyrate-co-3-hydroxyhexanoate, and wherein the aliphatic polyester-based resin (A) is polybutylene succinate and/or polybutylene succinate adipate.

* * * * *